US008375118B2

(12) United States Patent
Hao et al.

(10) Patent No.: US 8,375,118 B2
(45) Date of Patent: Feb. 12, 2013

(54) SMART HOME DEVICE MANAGEMENT

(75) Inventors: Jack Jianxiu Hao, Lexington, MA (US);
Guillermo Ortiz, Woburn, MA (US);
Heath Stallings, Colleyville, TX (US);
John P. Valdez, Flower Mound, TX (US); Wei Xia, Sudbury, MA (US);
Joseph M. Geiger, Clinton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 12/948,900

(22) Filed: Nov. 18, 2010

(65) Prior Publication Data

US 2012/0130513 A1 May 24, 2012

(51) Int. Cl.
*G06F 15/173* (2006.01)
*G06F 15/177* (2006.01)

(52) U.S. Cl. ......................................... 709/223; 715/736

(58) Field of Classification Search .................. 709/223, 709/224; 715/716–722, 733–747, 760, 965–970
See application file for complete search history.

(56) References Cited

U.S. PATENT DOCUMENTS

| | | | |
|---|---|---|---|
| 6,661,340 B1 * | 12/2003 | Saylor et al. ................... | 340/517 |
| 7,047,092 B2 * | 5/2006 | Wimsatt .......................... | 700/83 |
| 7,103,420 B2 * | 9/2006 | Brown et al. ................... | 700/19 |
| 7,680,906 B2 * | 3/2010 | Helander ........................ | 709/220 |
| 8,042,048 B2 * | 10/2011 | Wilson et al. .................. | 715/736 |
| 8,073,921 B2 * | 12/2011 | Thomas et al. ................ | 709/208 |
| 8,086,702 B2 * | 12/2011 | Baum et al. ................... | 709/220 |
| 8,086,703 B2 * | 12/2011 | Baum et al. ................... | 709/220 |
| 8,122,131 B2 * | 2/2012 | Baum et al. ................... | 709/226 |
| 2006/0053375 A1 * | 3/2006 | Humpleman et al. ......... | 715/736 |
| 2007/0143456 A1 * | 6/2007 | Mashinsky ..................... | 709/223 |
| 2007/0220907 A1 * | 9/2007 | Ehlers ............................. | 62/126 |
| 2008/0133723 A1 * | 6/2008 | Lee et al. ........................ | 709/222 |
| 2008/0228904 A1 * | 9/2008 | Crespo-Dubie et al. ...... | 709/223 |
| 2009/0066534 A1 * | 3/2009 | Sivakkolundhu ........ | 340/825.52 |
| 2009/0070436 A1 * | 3/2009 | Dawes et al. .................. | 709/219 |
| 2009/0070681 A1 * | 3/2009 | Dawes et al. .................. | 715/736 |
| 2009/0070682 A1 * | 3/2009 | Dawes et al. .................. | 715/736 |
| 2009/0070692 A1 * | 3/2009 | Dawes et al. .................. | 715/764 |
| 2009/0077622 A1 * | 3/2009 | Baum et al. .......................... | 726/1 |
| 2009/0077623 A1 * | 3/2009 | Baum et al. .......................... | 726/1 |
| 2009/0077624 A1 * | 3/2009 | Baum et al. .......................... | 726/1 |
| 2010/0023865 A1 * | 1/2010 | Fulker et al. ................... | 715/734 |
| 2010/0064227 A1 * | 3/2010 | Humpleman et al. ......... | 715/736 |
| 2010/0107112 A1 * | 4/2010 | Jennings et al. ............... | 715/777 |
| 2010/0138764 A1 * | 6/2010 | Hatambeiki et al. .......... | 715/765 |
| 2010/0153853 A1 * | 6/2010 | Dawes et al. .................. | 715/736 |
| 2010/0245107 A1 * | 9/2010 | Fulker et al. ................ | 340/691.6 |
| 2010/0280635 A1 * | 11/2010 | Cohn et al. ...................... | 700/90 |
| 2010/0281135 A1 * | 11/2010 | Cohn et al. .................... | 709/217 |
| 2010/0281161 A1 * | 11/2010 | Cohn et al. .................... | 709/224 |
| 2010/0281312 A1 * | 11/2010 | Cohn et al. ...................... | 714/49 |
| 2010/0283579 A1 * | 11/2010 | Kraus et al. .................... | 340/5.7 |
| 2010/0318685 A1 * | 12/2010 | Kraus et al. .................... | 709/249 |
| 2011/0015797 A1 * | 1/2011 | Gilstrap ........................ | 700/291 |

(Continued)

*Primary Examiner* — Patrice Winder
*Assistant Examiner* — Julian Chang

(57) ABSTRACT

A mobile communication device receives information associated with multiple home devices, and generates, based on the home device information, a connected home dashboard that includes a home device item, a modes item, a monitoring item, a security item, and a notifications item. The mobile communication device also provides the connected home dashboard for display to a user, and receives, from the user, a selection of one of the home device item, the modes item, the monitoring item, the security item, or the notifications item. The mobile communication device further provides, based on the home device information and for display to the user, information associated with the selected item.

21 Claims, 32 Drawing Sheets

U.S. PATENT DOCUMENTS

| | | | | |
|---|---|---|---|---|
| 2011/0015802 A1* | 1/2011 | Imes | | 700/300 |
| 2011/0046792 A1* | 2/2011 | Imes et al. | | 700/278 |
| 2011/0046798 A1* | 2/2011 | Imes et al. | | 700/286 |
| 2011/0046799 A1* | 2/2011 | Imes et al. | | 700/286 |
| 2011/0046800 A1* | 2/2011 | Imes et al. | | 700/286 |
| 2011/0046801 A1* | 2/2011 | Imes et al. | | 700/286 |
| 2011/0051823 A1* | 3/2011 | Imes et al. | | 375/259 |
| 2011/0054699 A1* | 3/2011 | Imes et al. | | 700/276 |
| 2011/0054710 A1* | 3/2011 | Imes et al. | | 700/286 |
| 2011/0102171 A1* | 5/2011 | Raji et al. | | 340/539.11 |
| 2011/0128378 A1* | 6/2011 | Raji | | 348/143 |
| 2011/0130887 A1* | 6/2011 | Ehlers, Sr. | | 700/296 |
| 2011/0173542 A1* | 7/2011 | Imes et al. | | 715/735 |
| 2011/0202185 A1* | 8/2011 | Imes et al. | | 700/277 |
| 2011/0214060 A1* | 9/2011 | Imes et al. | | 715/735 |
| 2011/0224838 A1* | 9/2011 | Imes et al. | | 700/295 |
| 2011/0246898 A1* | 10/2011 | Imes et al. | | 715/735 |
| 2011/0307101 A1* | 12/2011 | Imes et al. | | 700/276 |
| 2012/0023212 A1* | 1/2012 | Roth et al. | | 709/223 |
| 2012/0023225 A1* | 1/2012 | Imes et al. | | 709/224 |
| 2012/0046859 A1* | 2/2012 | Imes et al. | | 701/409 |
| 2012/0066608 A1* | 3/2012 | Sundermeyer et al. | | 715/738 |
| 2012/0066632 A1* | 3/2012 | Sundermeyer et al. | | 715/771 |
| 2012/0072033 A1* | 3/2012 | Imes et al. | | 700/278 |

* cited by examiner

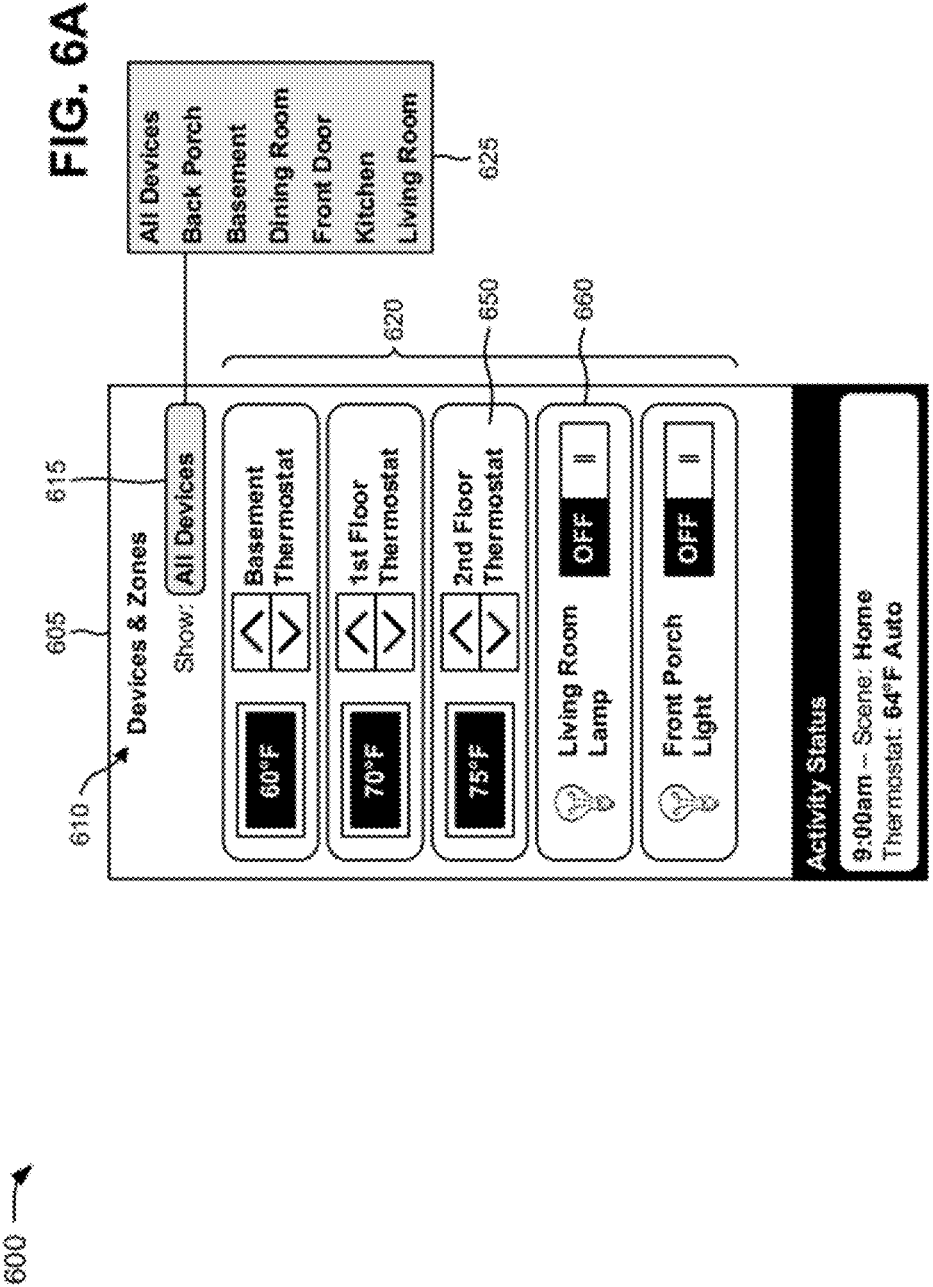

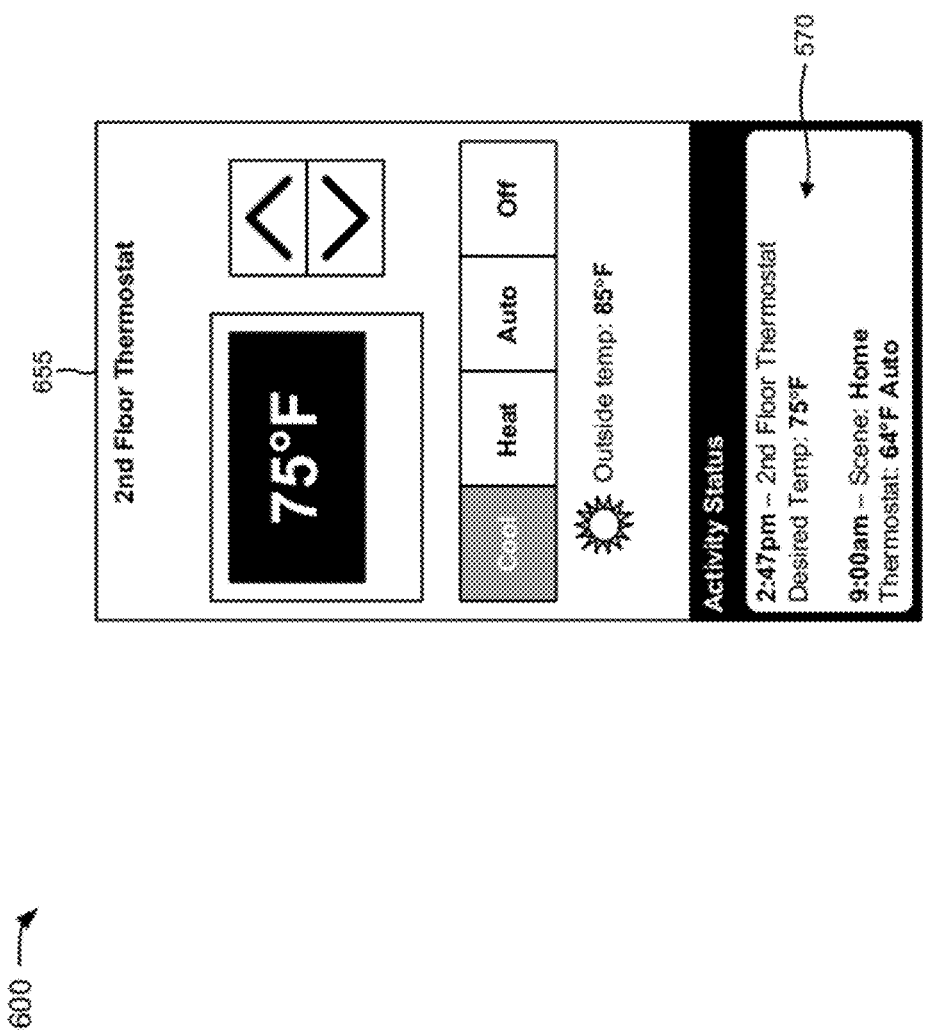

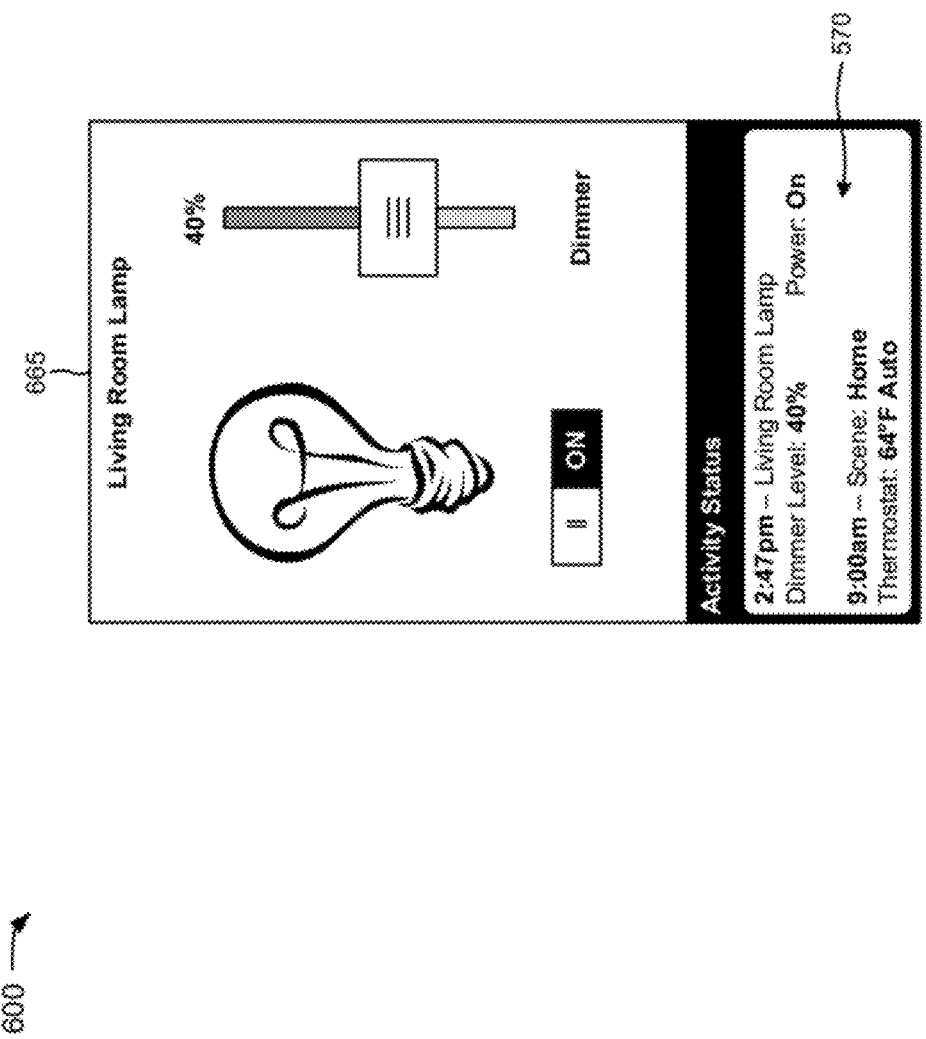

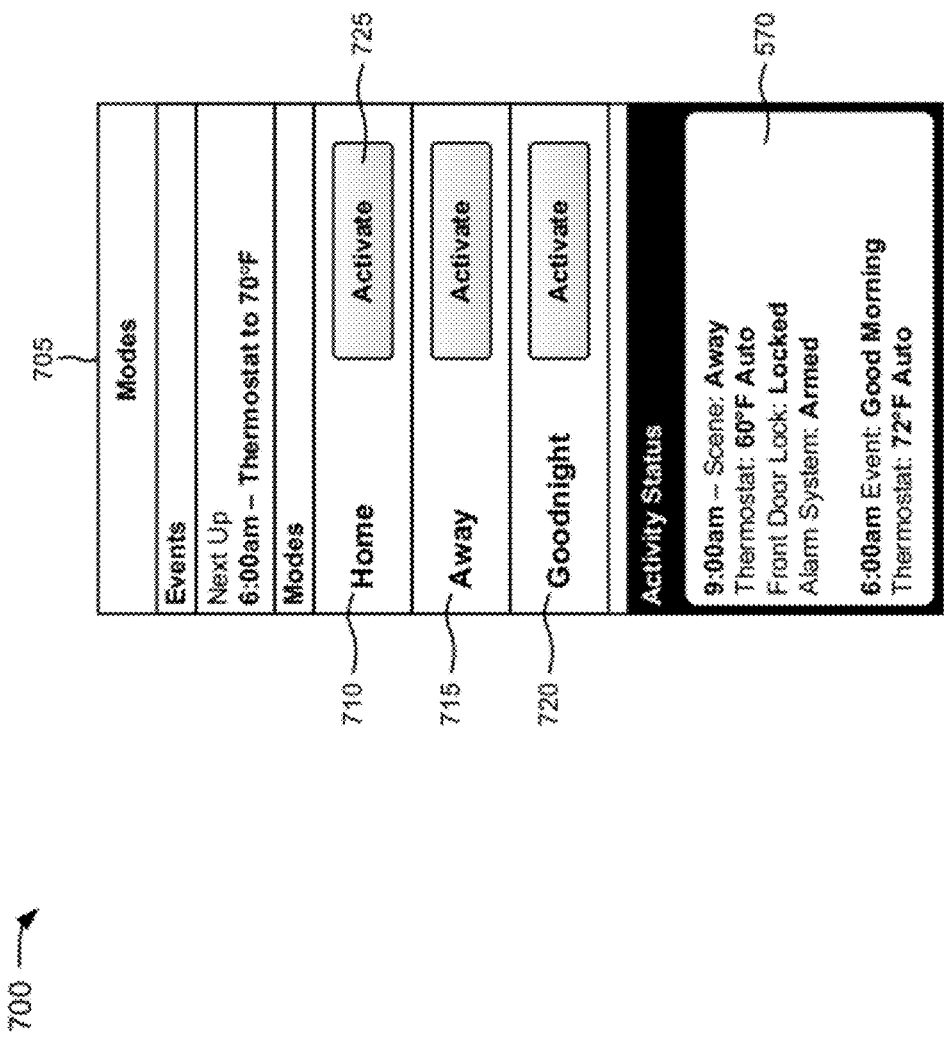

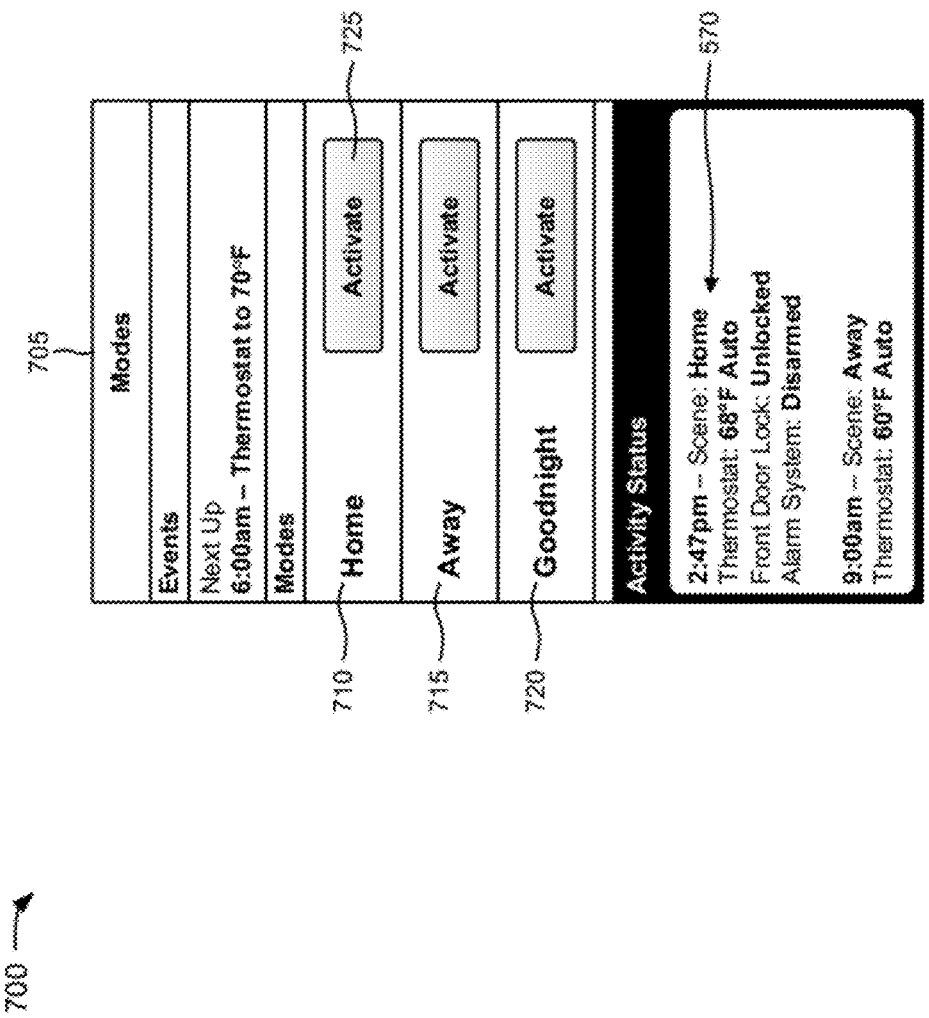

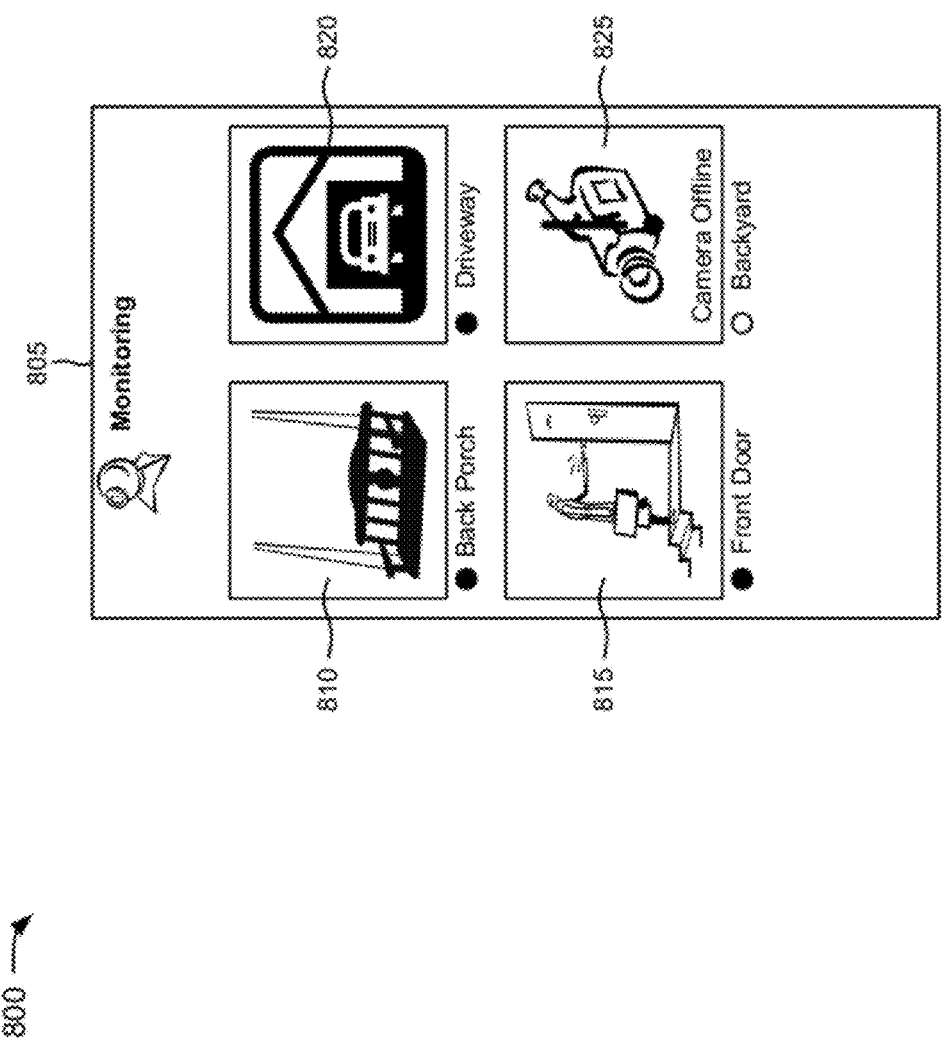

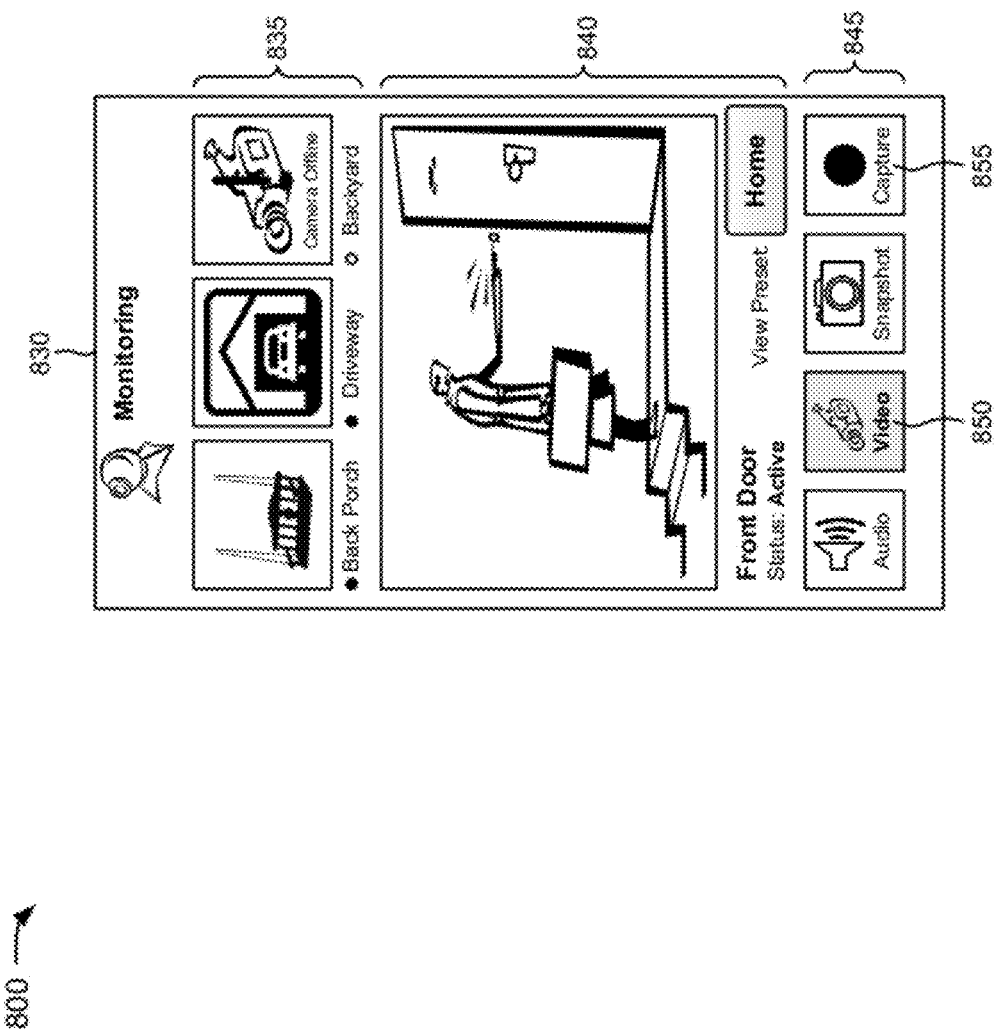

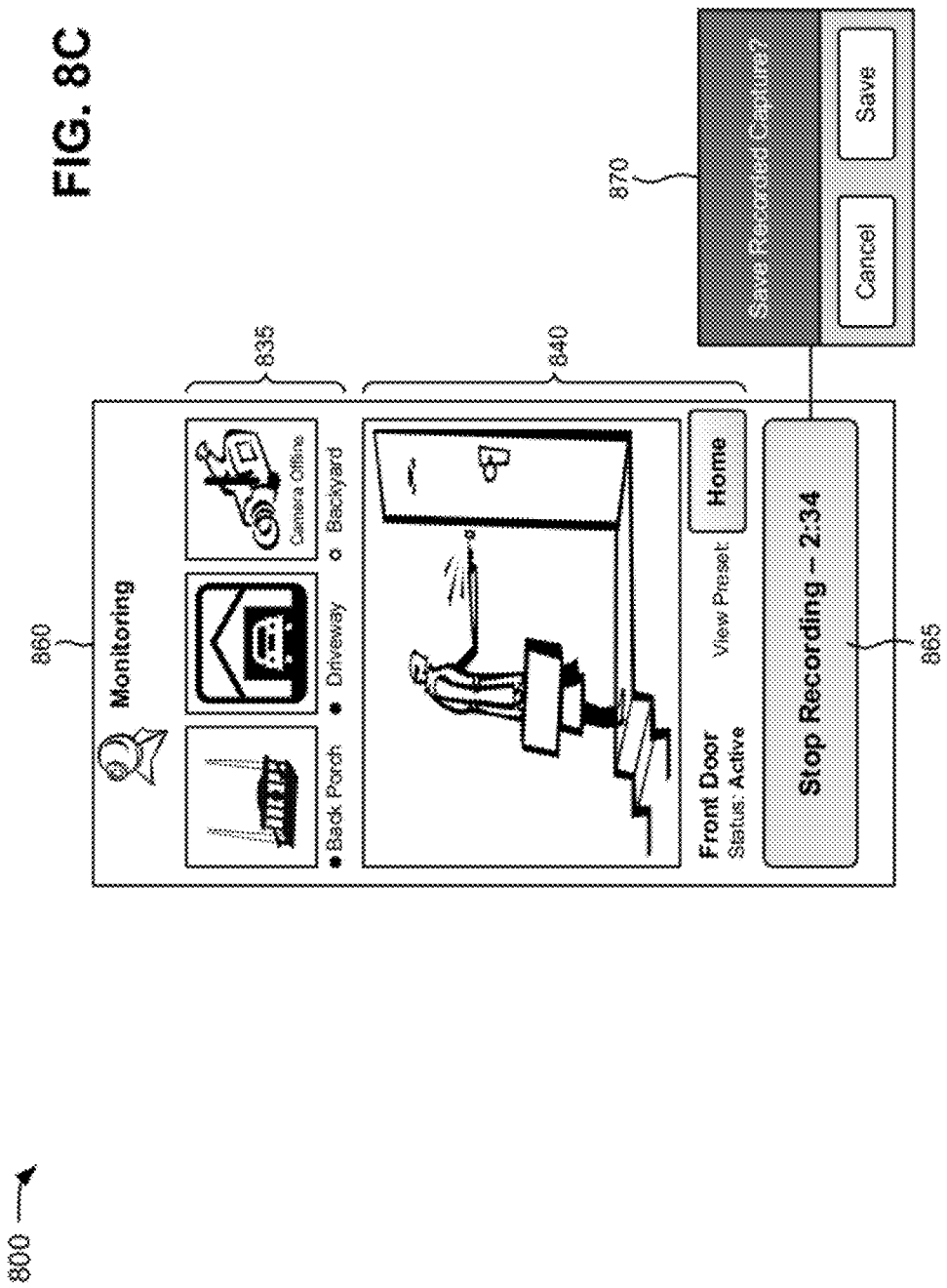

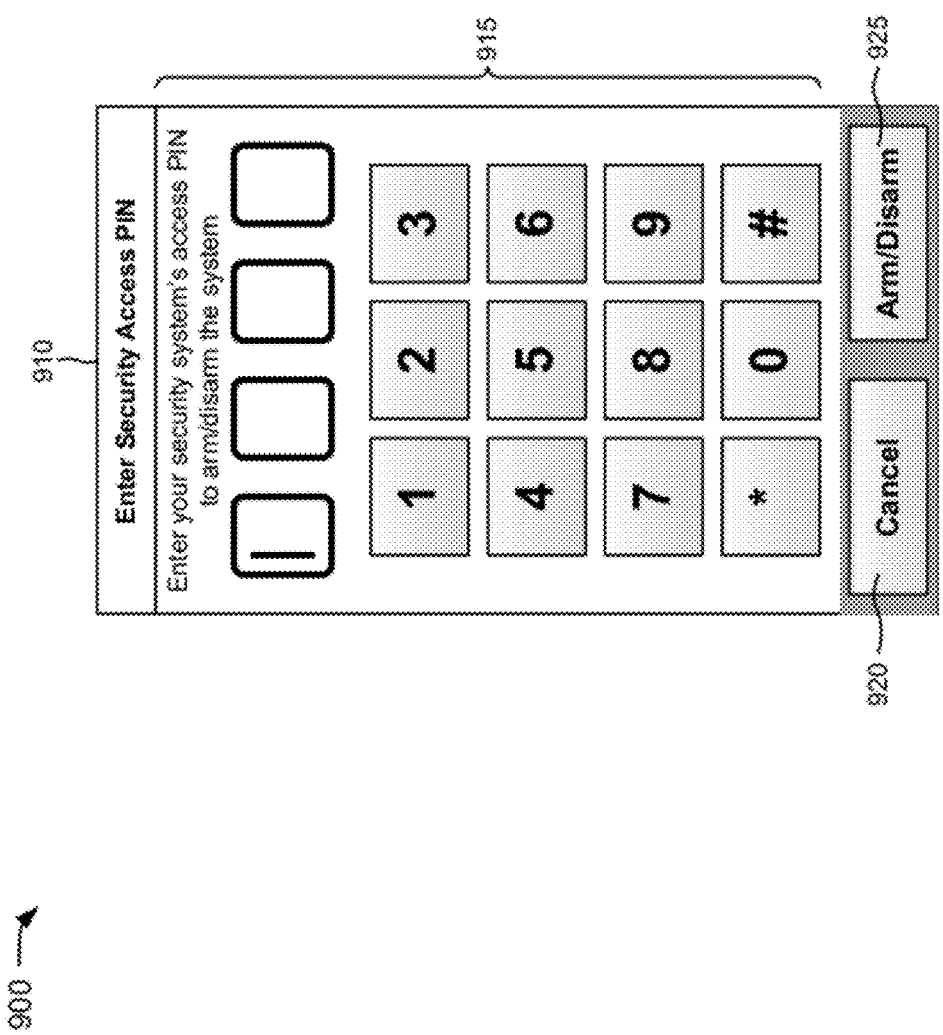

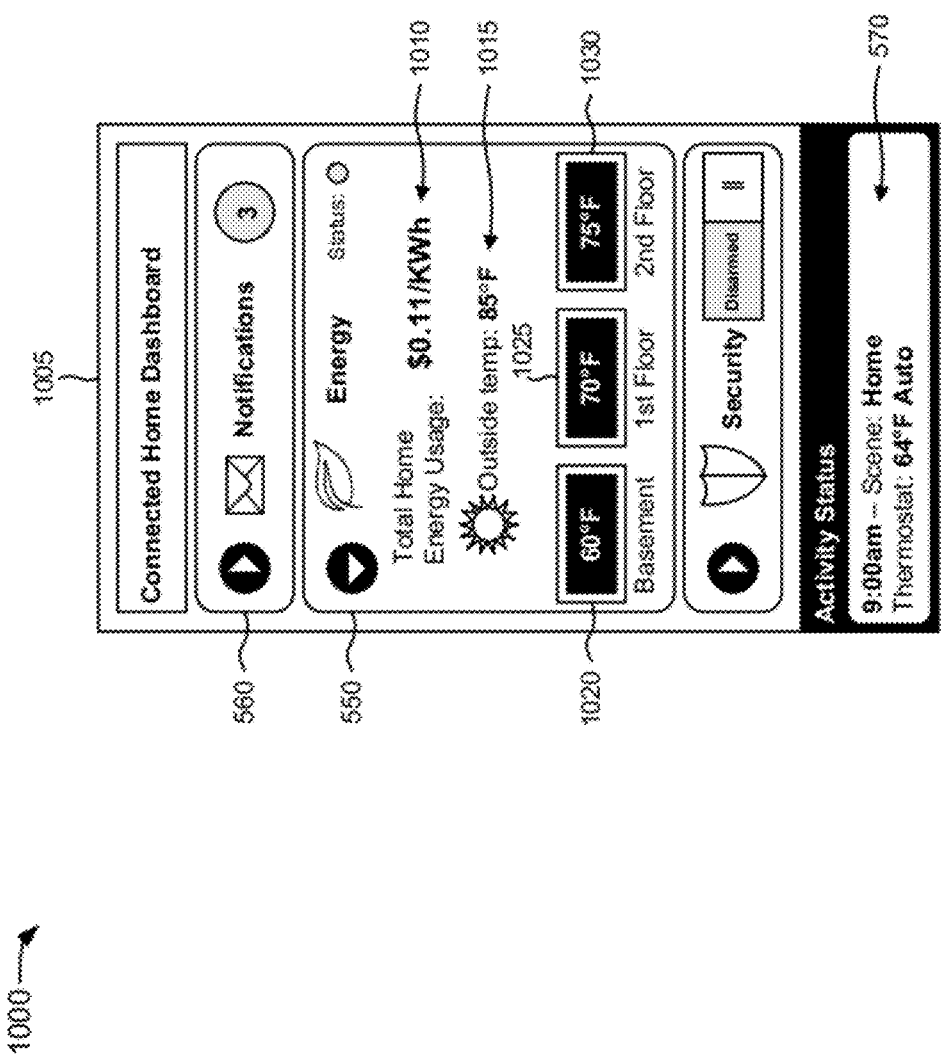

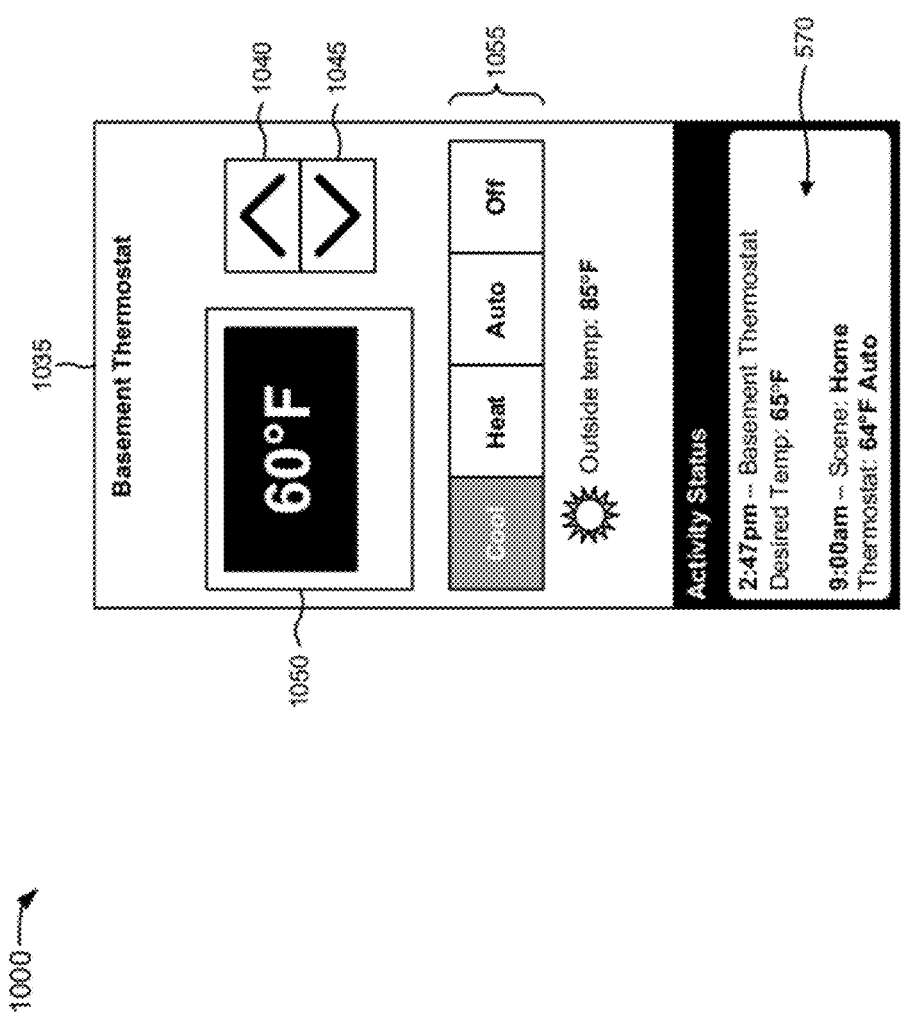

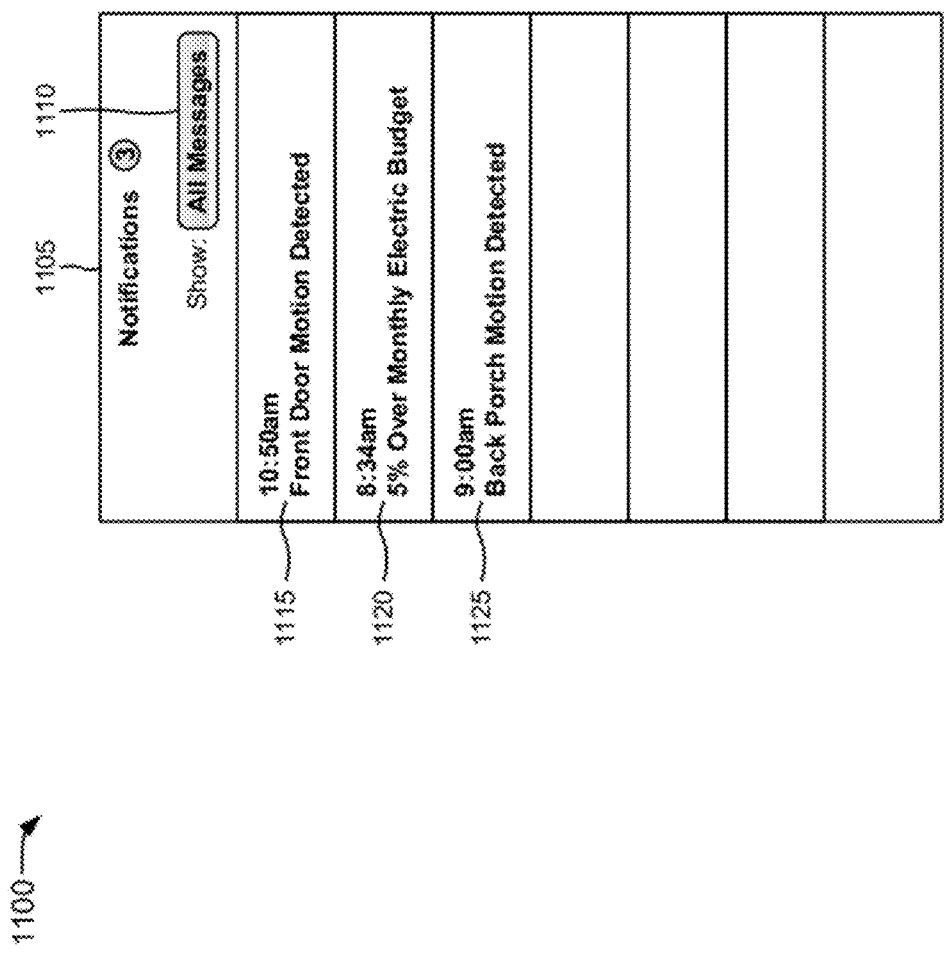

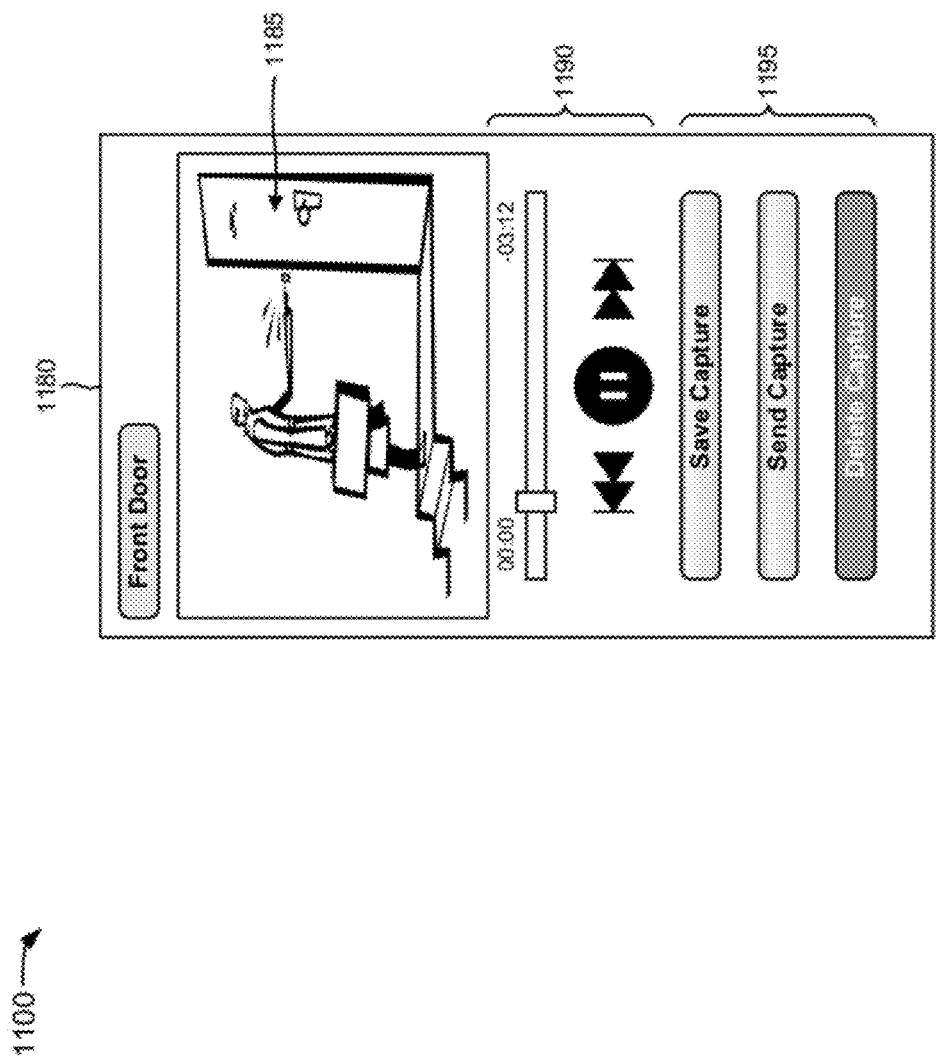

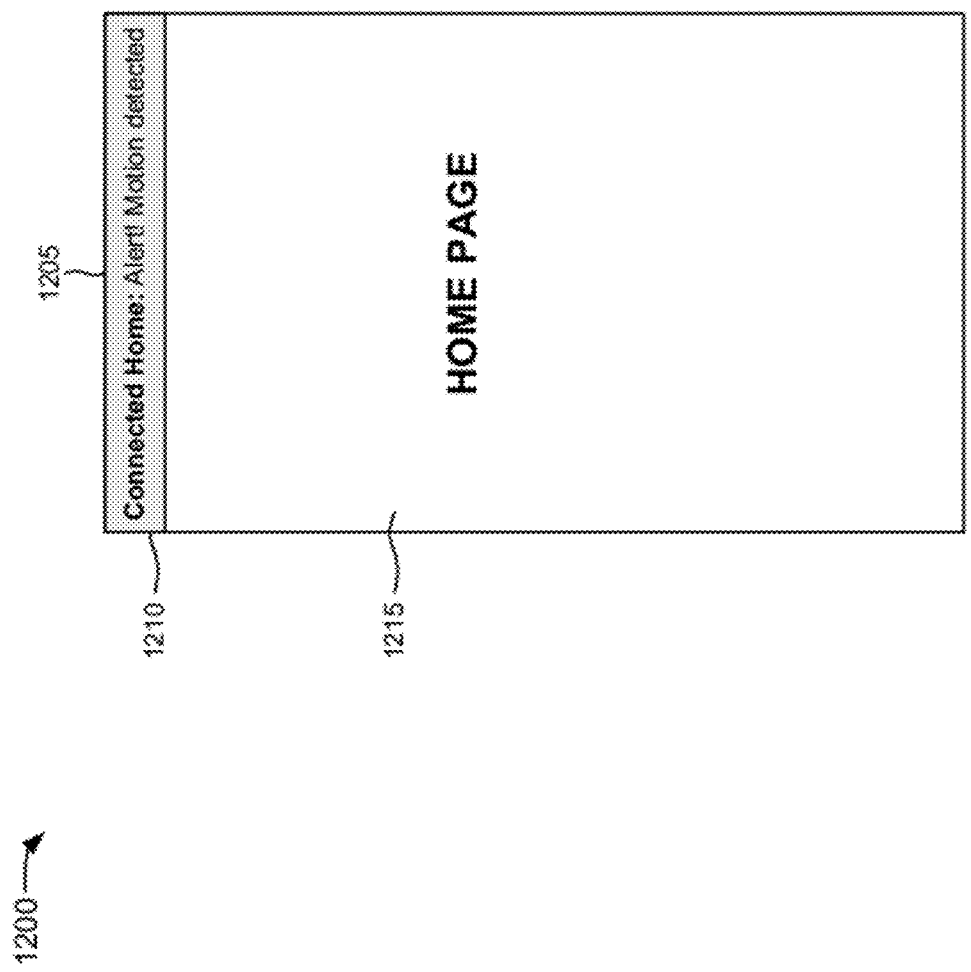

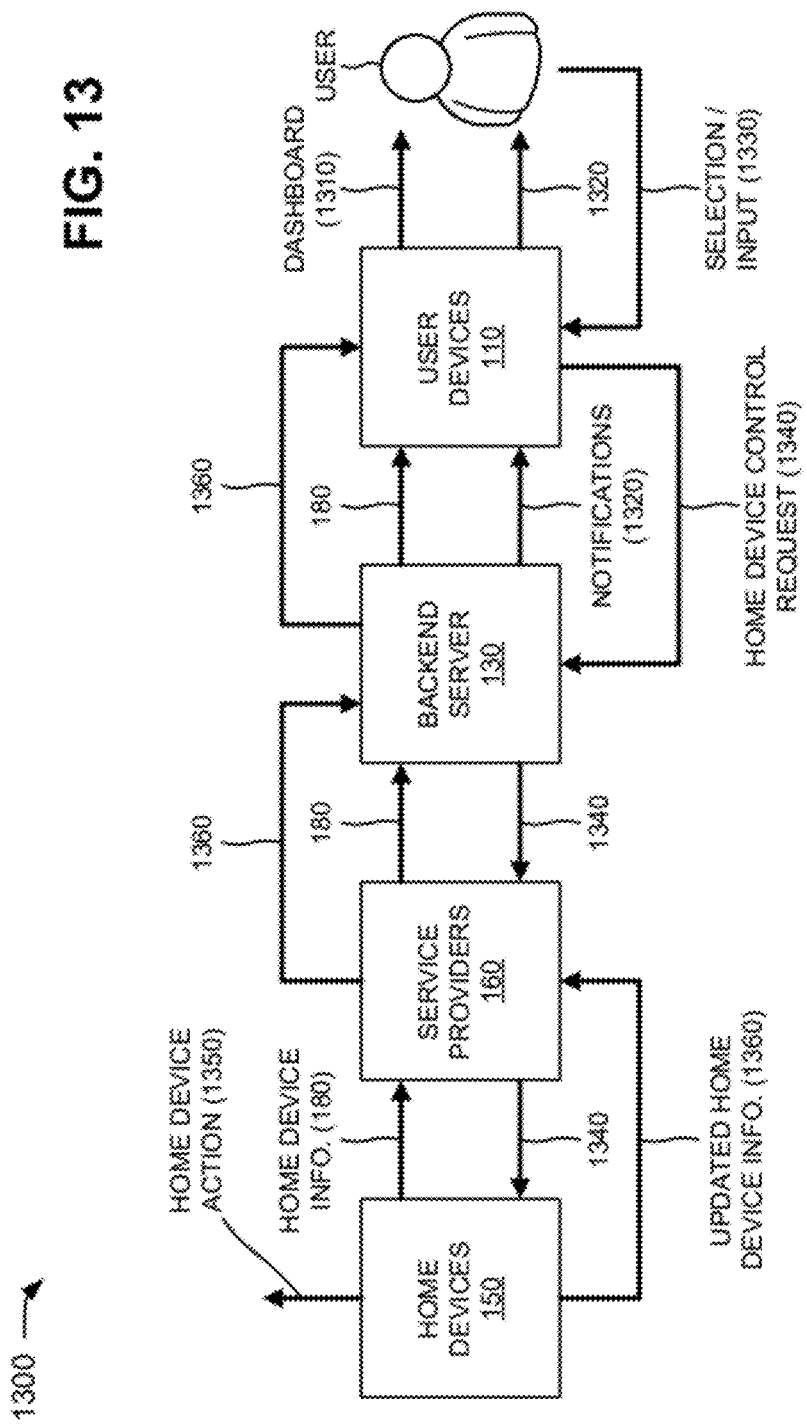

- 1505: RECEIVE INFORMATION ASSOCIATED WITH HOME DEVICES
- 1510: PROVIDE, BASED ON HOME DEVICE INFO., DASHBOARD THAT INCLUDES HOME DEVICE ITEM / MODES ITEM / MONITORING ITEM / SECURITY ITEM / ENERGY ITEM / NOTIFICATIONS ITEM

- 1515: RECEIVE SELECTION OF HOME DEVICE ITEM → 1520: DISPLAY INFO. ASSOCIATED WITH HOME DEVICES
- 1525: RECEIVE SELECTION OF MODES ITEM → 1530: DISPLAY INFO. ASSOCIATED WITH HOME DEVICE MODES
- 1535: RECEIVE SELECTION OF MONITORING ITEM → 1540: DISPLAY INFO. PROVIDED BY AUDIO / VISUAL HOME DEVICES
- 1545: RECEIVE SELECTION OF SECURITY ITEM → 1550: DISPLAY INFO. FOR HOME SECURITY SYSTEM
- 1555: RECEIVE SELECTION OF ENERGY ITEM → 1560: DISPLAY INFO. FROM HVAC / ELECTRIC / THERMOSTATS
- 1565: RECEIVE SELECTION OF NOTIF. ITEM → 1570: DISPLAY HOME DEVICE NOTIF.

SMART HOME DEVICE MANAGEMENT

BACKGROUND

Every home has numerous home devices, such as electrical systems (e.g., light switches, televisions, radios, etc.), mechanical systems (e.g., windows, doors, door locks, etc.), communication systems (e.g., a security system, a local area network (LAN), etc.), and entertainment systems (e.g., televisions, home theater systems, etc.). A smart home (or connected home) brings all of these home devices together. By wiring controls of each home device to one point, commonly known as a control system overlay, the home devices can be integrated and made interoperable. The control system overlay provides a single, unified interface for the control of individual home devices. For example, a same device used to control a home's interior lighting can also be used to adjust heat in a living room, turn off a stereo, turn on a television, etc.

Such smart home automation technologies are commercially available. However, interoperability problems of different hardware and software components (e.g., of home devices), limited service scalability, complexity of configuration, and excessive cost have prevented mass adoption of smart home automation technologies.

BRIEF DESCRIPTION OF THE DRAWINGS

FIGS. 6A-6E are diagrams of example devices/zones user interfaces capable of being generated by one of the user devices of FIG. 1;

FIGS. 7A-7D are diagrams of example modes user interfaces capable of being generated by one of the user devices of FIG. 1;

FIGS. 8A-8C are diagrams of example monitoring user interfaces capable of being generated by one of the user devices of FIG. 1;

FIGS. 9A-9C are diagrams of example security user interfaces capable of being generated by one of the user devices of FIG. 1;

FIGS. 10A and 10B are diagrams of example energy user interfaces capable of being generated by one of the user devices of FIG. 1;

FIGS. 11A-11D are diagrams of example notification user interfaces capable of being generated by one of the user devices of FIG. 1;

FIGS. 12A-12C are diagrams of other example notification user interfaces capable of being generated by one of the user devices of FIG. 1;

FIG. 13 is a diagram of example operations capable of being performed by an example portion of the network illustrated in FIG. 1;

FIG. 15 is a flow chart of another example process for providing smart home device management according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide management of home devices (e.g., lights, security systems, electronics, video surveillance, energy systems, monitoring systems, etc.) via one or more user devices (e.g., mobile communication devices, computers, televisions, set-top boxes (STBs), etc.). For example, the systems and/or methods may enable a user of a mobile communication device (e.g., a cell phone, a smart phone, a personal digital assistant (PDA), etc.) to receive an overview of the home devices in a single dashboard displayed on the mobile communication device. The user may drill down the dashboard to a particular category of home devices (e.g., home devices associated with energy), or may directly view the home devices and/or zones provided or defined in a home. The user may select one of the home devices, and the systems and/or methods may display details associated with the selected home device. The systems and/or methods may also enable the user to control the operation of the selected home device (e.g., turn on a light, change a thermostat setting, etc.).

In one example implementation, the systems and/or methods may receive information associated with home devices, and may provide, based on the home device information, a dashboard that includes a home device item (e.g., a selection mechanism, such as an icon, a tile, or a button), a modes item, a monitoring item, a security item, an energy item, and a notifications item. If the home device item is selected (e.g., by a user), the systems and/or methods may display information associated with the home devices (e.g., a thermostat reading and controls may be displayed). If the modes item is selected, the systems and/or methods may display information associated with modes (e.g., home, away, night, day, etc.) of the home devices. If the monitoring item is selected, the systems and/or methods may display information provided by audio and visual home devices (e.g., surveillance cameras, intercom systems, speakers, etc.). If the security item is selected, the systems and/or methods may display information associated with a home security system (e.g., a security code input screen, a system status, etc.). If the energy item is selected, the systems and/or methods may display information associated with home devices related to energy consumption (e.g., heating ventilation and air conditioning (HVAC) systems, thermostats, lights, electronic devices, etc.). If the notifications item is selected, the systems and/or methods may display notifications associated with home devices (e.g., warnings generated by motion detectors, alerts regarding unlocked doors, etc.).

As used herein, the term "user" is intended to be broadly interpreted to include a user device or a user of a user device.

Figure 1:
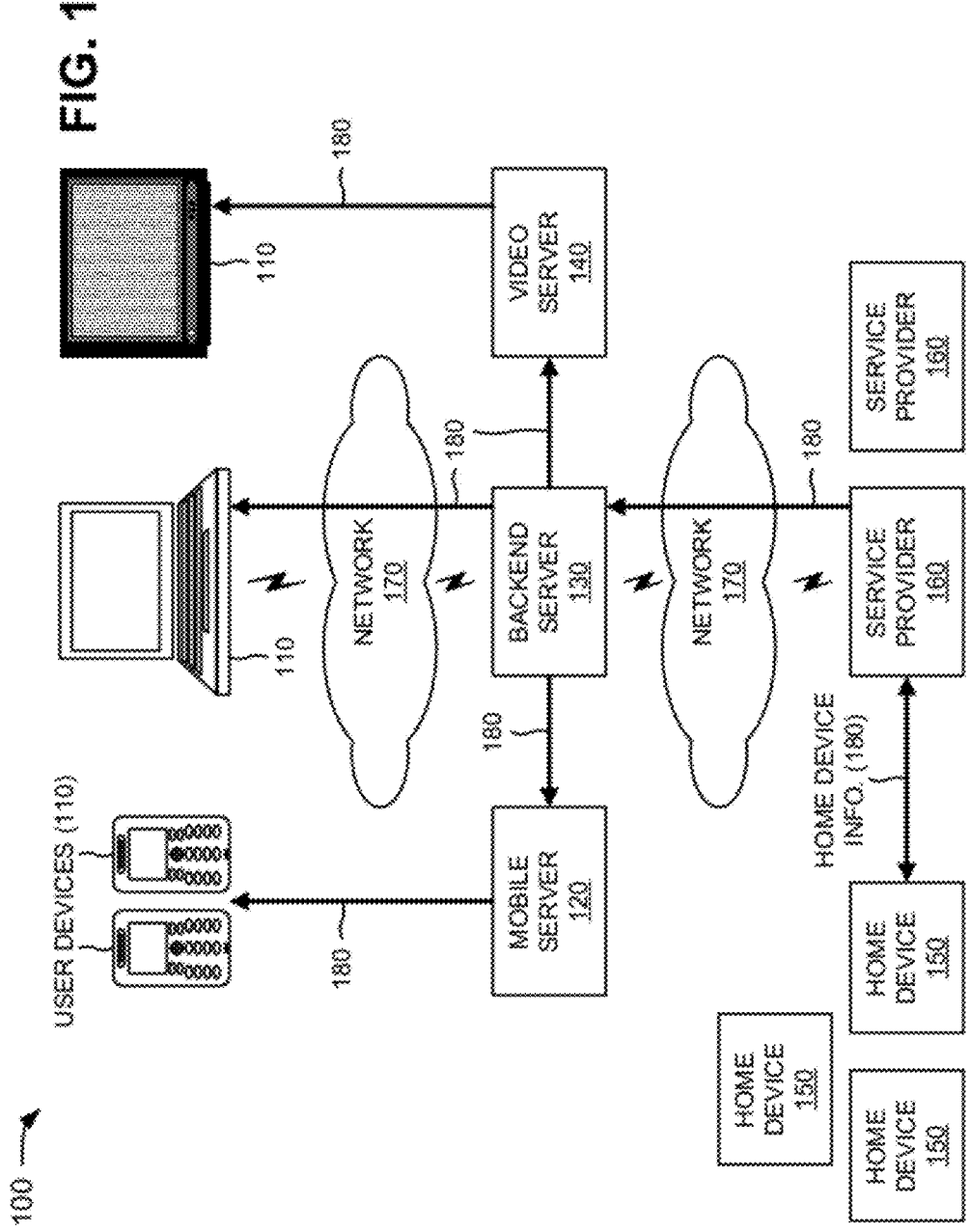
FIG. 1 is a diagram of an example network in which systems and/or methods described herein may be implemented.

FIG. 1 is a diagram of an example network 100 in which systems and/or methods described herein may be implemented. As illustrated, network 100 may include user devices 110, a mobile server 120, a backend server 130, a video server 140, home devices 150, and service providers 160 interconnected by networks 170. Components of network 100 may interconnect via wired and/or wireless connections. Four user devices 110, one mobile server 120, one backend server 130, one video server 140, three home devices 150, two service providers 160, and two networks 170 have been illustrated in FIG. 1 for simplicity. In practice, there may be more user devices 110, mobile servers 120, backend servers 130, video servers 140, home devices 150, service providers 160, and/or networks 170. Also, in some instances, one or more of the components of network 100 may perform one or more functions described as being performed by another one or more of the components of network 100.

Each of user devices 110 may include any device that is capable of communicating with home devices 150 via mobile server 120, backend server 130, video server 140, service providers 160, and/or networks 170. For example, user device 110 may include a mobile computation and/or communication device, such as a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a user's home) computation and/or communication device, such as a laptop computer, a personal computer, a tablet computer, a STB, a television, a gaming system, etc.

In one example implementation, user device 110 may receive information 180 associated with home devices 150, and may display to a user (e.g., based on home device information 180) a dashboard that includes selectable items, such as a home device item, a modes item, a monitoring item, a security item, an energy item, and a notifications item. Home device information 180 may include any information capable of being generated by home devices 150. For example, if home device 150 is a thermostat, home device information 180 for the thermostat may include a temperature recorded by the thermostat, a desired (or set) temperature for an area of the home, controls for the thermostat (e.g., an up arrow to increase a set temperature, a down arrow to decrease a set temperature, etc.), etc. In another example, if home device 150 is a surveillance camera, home device information 180 may include video captured by the surveillance camera, images captured by the surveillance camera, controls for the surveillance camera (e.g., mechanisms to control movement of the surveillance camera, to control zooming of the surveillance camera, etc.), etc.

If the home device item is selected (e.g., by the user), user device 110 may display home device information 180 (e.g., video captured by a surveillance camera may be displayed). If the modes item is selected, user device 110 may display information associated with modes of home devices 150 (e.g., in a home mode, a security system may be disabled, lights may be turned on, doors may be unlocked, etc.). If the monitoring item is selected, user device 110 may display information provided by audio and/or visual home devices 150 (e.g., cameras). If the security item is selected, user device 110 may display information associated with a home security system. If the energy item is selected, user device 110 may display home device information 180 related to energy consumption (e.g., energy usage, thermostats, lights, electronic devices, etc.). If the notifications item is selected, user device 110 may display notifications associated with home devices 150 (e.g., a notification that a television is in use).

Mobile server 120 may include one or more server devices, or other types of computation or communication devices, that gather, process, search, and/or provide information in a manner described herein. In one example implementation, mobile server 120 may receive home device information 180 from backend server 130, and may provide home device information 180 to one or more user devices 110 (e.g., to mobile communication devices). In another example implementation, mobile server 120 may receive (e.g., from user device(s) 110) requests to control home devices 150, and may provide the requests to backend server 130. In one example, mobile server 120 may transform messages (e.g., short message service (SMS) messages) into mobile network traffic from other media, or vice versa. Mobile server 120 may permit transmission or receipt of SMS messages to or from user devices 110 (e.g., mobile communication devices).

Backend server 130 may include one or more server devices, or other types of computation or communication devices, that gather, process, search, and/or provide information in a manner described herein. In one example implementation, backend server 130 may receive home device information 180, and may determine, based on home device information 180, whether notifications are needed for home devices 150. For example, if motion is detected by a home device 150 (e.g., a motion detector), backend server 130 may determine that a notification of this detected motion should be provided to user device 110. In another example, if a home device 150 (e.g., a security system) generates an alarm, backend server 130 may determine that a notification of this alarm should be provided to user device 110.

If notifications are needed, backend server 130 may provide home device information 180 and the notifications (e.g., for home devices 150) to user device 110. If notifications are not needed, backend server 130 may only provide home device information 180 to user device 110. Backend server 130 may receive, from user device 110, a request to control a particular home device 150, and may provide the control request to the particular home device 150 for implementing. For example, if the particular home device 150 is a light switch, the control request may include turning the light switch off. Backend server 130 may provide the control request to the light switch, and the light switch may turn itself off. Backend server 130 may receive updated home device information 180 based on implementation of the control request (e.g., the updated home device information 180 may indicate that the light switch is turned off), and may provided the updated home device information 180 to user device 110.

Video server 140 may include one or more server devices, or other types of computation or communication devices, that gather, process, search, and/or provide information in a manner described herein. In one example, video server 140 may include a computer system, an application, a cable head-end, and/or a broadcasting device capable of providing video content (e.g., video on demand (VOD) content, high definition (HD)-VOD content, television programming, movies, on-demand services, live television, etc.) in a variety of formats, commercials, advertisements, instructions, and/or other information. In one example implementation, video server 140 may receive home device information 180 from backend server 130, and may provide home device information 180 to one or more user devices 110 (e.g., to a television or a STB). In another example implementation, video server 140 may receive (e.g., from user device(s) 110) requests to control home devices 150, and may provide the requests to backend server 130.

Home device 150 may include any device capable of providing information associated with a home (or another area to be controlled), any device (e.g., provided in a home or another area) that is capable of being controlled, etc. For example, home devices 150 may include devices provided in electrical systems (e.g., light switches, lights, televisions, radios, etc.), devices provided in mechanical systems (e.g., windows, doors, door locks, etc.), devices provided in communication systems (e.g., security system devices, surveillance cameras, LAN devices, routers, modems, etc.), devices provided in entertainment systems (e.g., televisions, home theater systems, stereos, etc.), etc.

Service provider 160 may include one or more server devices, or other types of computation or communication devices, that gather, process, search, and/or provide information in a manner described herein. In one example, service provider 160 may include a computer system, an application, a cable head-end, a broadcasting device, a mobile communications system, etc. capable of providing information to user devices 110. For example, service providers 160 may include mobile communications providers (e.g., wireless providers), video content providers (e.g., television providers, VOD providers, over-the-top (OTT) content providers, etc.), Internet service providers, smart home providers, etc. In one example implementation, service provider 160 may receive home device information 180 from home devices 150, and may provide home device information 180 to backend server 130. In another example implementation, service provider 160 may receive (e.g., from user device(s) 110 and backend server 130) requests to control home devices 150, and may provide the requests to home devices 150 (e.g., for implementation by home devices 150).

Each of networks 170 may include a LAN, a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows example components of network 100, in other implementations, network 100 may contain fewer components, different components, differently arranged components, or additional components than depicted in FIG. 1.

Figure 2:
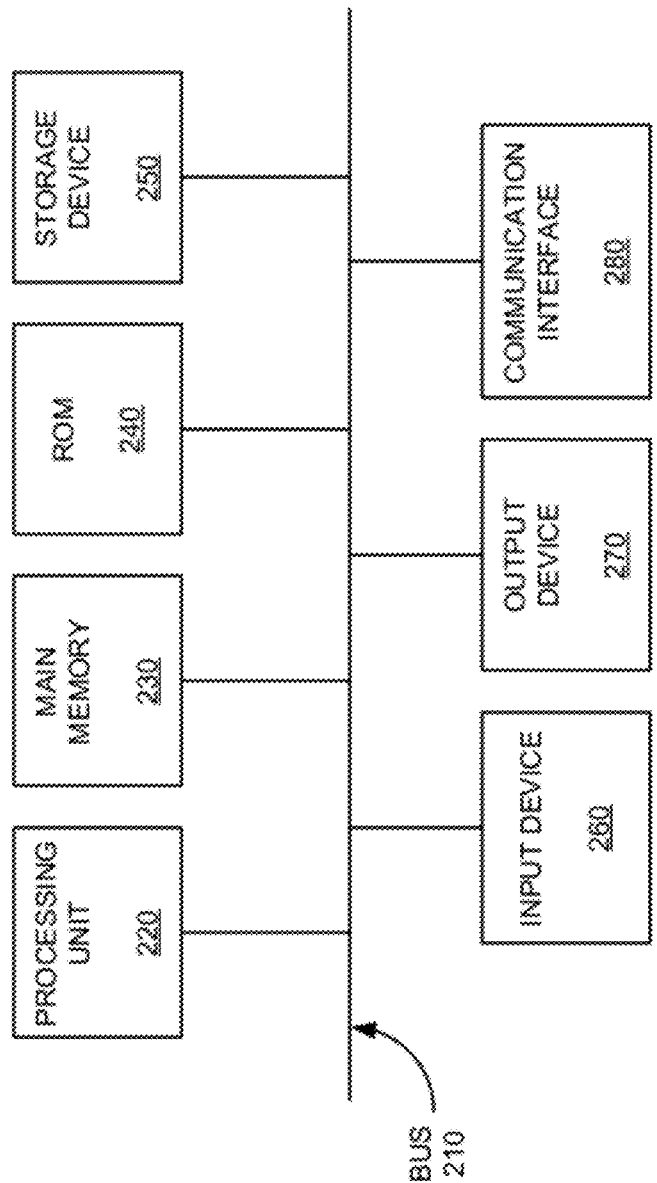
FIG. 2 is a diagram of example components of one or more devices of the network depicted in FIG. 1.

FIG. 2 is a diagram of example components of a device 200 that may correspond to one or more devices of network 100. As illustrated, device 200 may include a bus 210, a processing unit 220, a main memory 230, a read-only memory (ROM) 240, a storage device 250, an input device 260, an output device 270, and a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
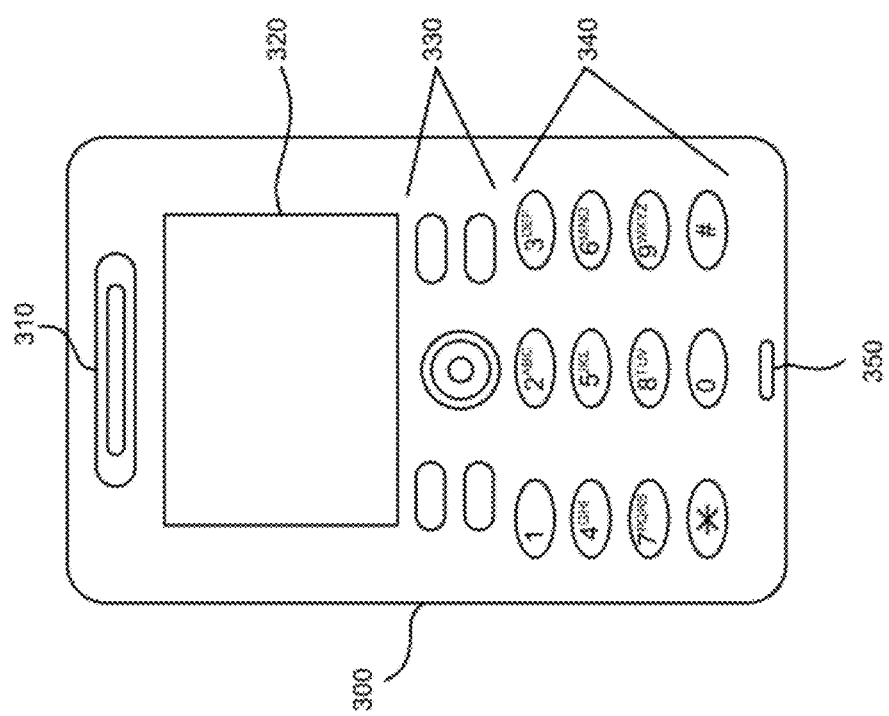
FIG. 3 is a diagram of an example user device of the network illustrated in FIG. 1.

FIG. 3 is a diagram of an example user device 110 (e.g., a mobile communication device). As illustrated, user device 110 may include a housing 300, a speaker 310, a display 320, control buttons 330, a keypad 340, and a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, etc. In one example implementation, display 320 may include a touch screen display that may be configured to receive a user input when the user touches display 320. For example, the user may provide an input to display 320 directly, such as via the user's finger, or via other input objects, such as a stylus. User inputs received via display 320 may be processed by components and/or devices operating in user device 110. The touch screen display may permit the user to interact with user device 110 in order to cause user device 110 to perform one or more operations described herein. Exemplary technologies to implement a touch screen on display 320 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 320 to be used as an input device. The touch-screen-enabled display 320 may also identify movement of a body part or a pointing device as it moves on or near the surface of the touch-screen-enabled display 320.

Control buttons 330 may permit the user to interact with user device 110 to cause user device 110 to perform one or more operations. For example, control buttons 330 may be used to cause user device 110 to transmit information. Keypad 340 may include a standard telephone keypad. In one example implementation, control buttons 330 and/or keypad 340 may be omitted, and the functionality provided by control buttons 330 and/or keypad 340 may be provided by display 320 (e.g., via a touch screen display). Microphone 350 may receive audible information from the user.

Although FIG. 3 shows example components of user device 110, in other implementations, user device 110 may contain fewer components, different components, differently arranged components, or additional components than depicted in FIG. 3. In still other implementations, one or more components of user device 110 may perform one or more other tasks described as being performed by one or more other components of user device 110.

Figure 4:
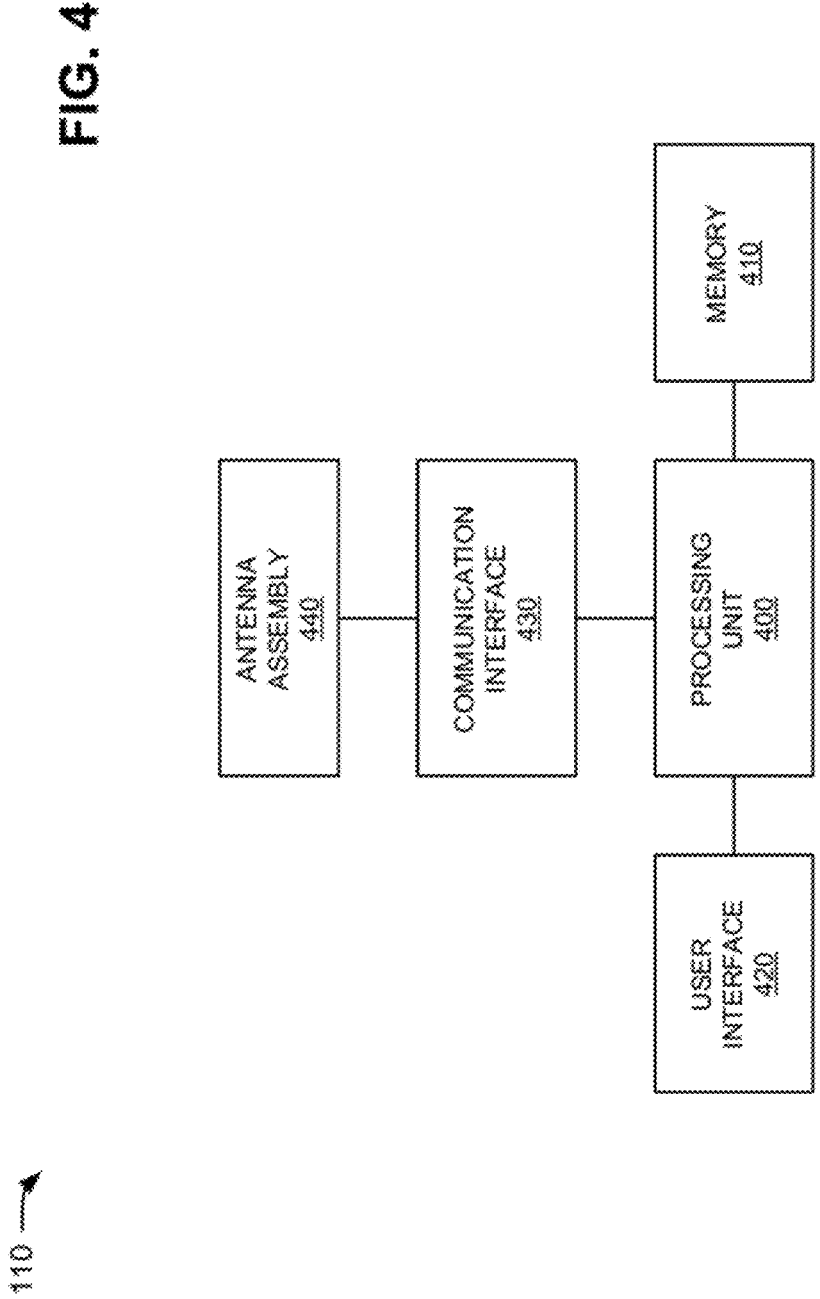
FIG. 4 is a diagram of example components of the user device depicted in FIG. 3.

FIG. 4 is a diagram of example components of user device 110. As shown, user device 110 may include a processing unit 400, memory 410, a user interface 420, a communication interface 430, and an antenna assembly 440. Components of user device 110 may interconnect via wired and/or wireless connections.

Processing unit 400 may include one or more processors, microprocessors, application specific integrated circuits (ASICs), field programmable gate arrays (FPGAs), or the like. Processing unit 400 may control operation of user device 110 and its components in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As will be described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of user device 110, in other implementations, user device 110 may contain fewer components, different components, differently arranged components, or additional components than depicted in FIG. 4. In still other implementations, one or more components of user device 110 may perform one or more other tasks described as being performed by one or more other components of user device 110.

Figure 5:
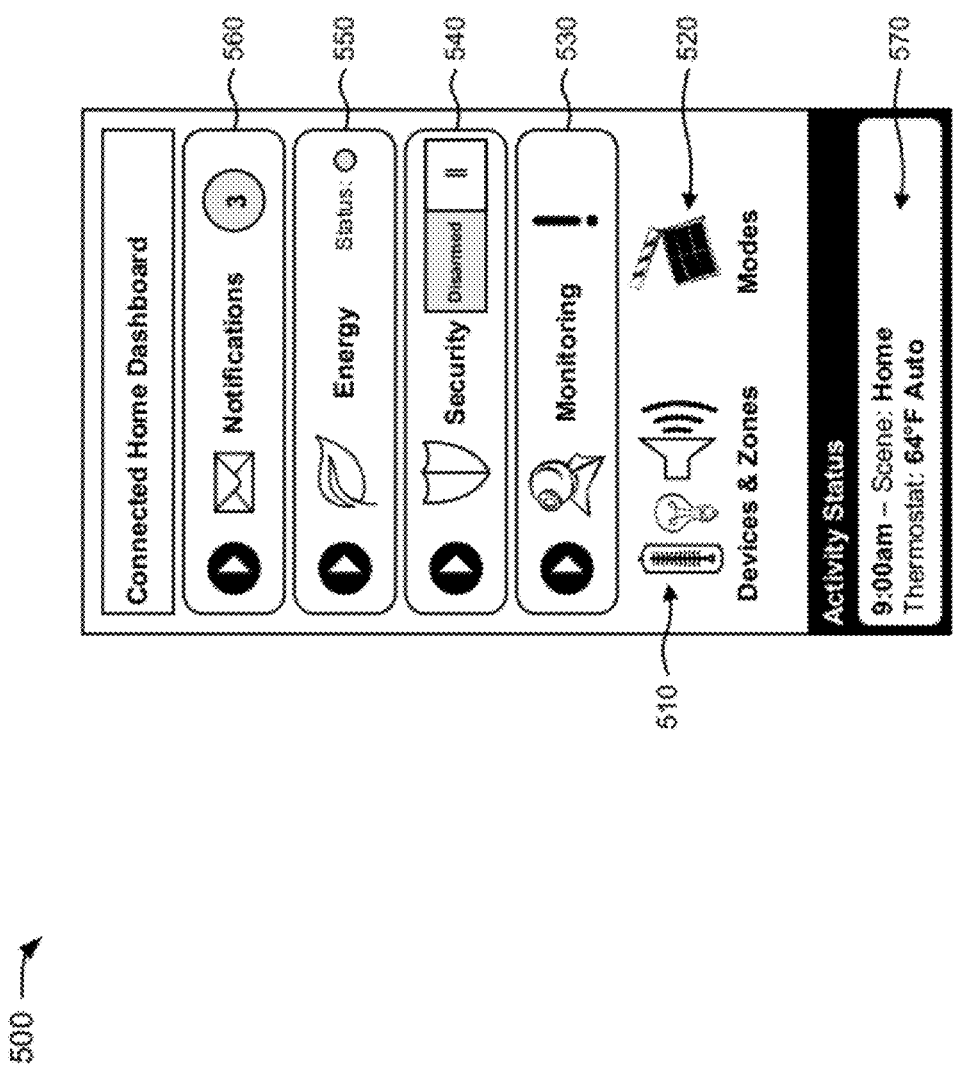
FIG. 5 is a diagram of an example dashboard user interface capable of being generated by one of the user devices of FIG. 1.

FIG. 5 is a diagram of an example dashboard user interface 500 capable of being generated by one of user devices 110. User interface 500 and the user interfaces depicted in FIGS. 6A-12C (hereinafter referred to as "user interfaces") may include graphical user interfaces (GUIs) or non-graphical user interfaces, such as text-based interfaces. The user interfaces may provide information to users via customized interfaces and/or other types of interfaces (e.g., browser-based interfaces, television interfaces, etc.). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., via display 320).

In one example implementation, the user interfaces may depict representations (e.g., via extended markup language (XML) code or other code) of one or more home devices 150. Each representation of a home device 150 may include a defined area with properties (e.g., a label, a date, a time, etc.), a set of controls (e.g., to perform actions with or on home devices 150), and a layout mechanism for the controls. Each control (e.g., of the set of controls) may include a widget (e.g., a graphical representation) that enables a user to view information (e.g., a current temperature) or to perform actions with or on home devices 150. Examples of control widgets may include representations of a door knob, an up button, a down button, an on/off switch, a text button, a digital display, an analog display, etc. For example, if a home device 150 is a door, the door may be visually represented (e.g., by the user interfaces) via a door knob widget and a lock/unlock switch widget. In another example, if a home device 150 is a thermostat, the thermostat may be visually represented (e.g., by the user interfaces) via a current temperature widget (e.g., a digital display), a set temperature widget (e.g., a digital display), an up button (e.g., to increase the set temperature), a down button (e.g., to decrease the set temperature), and an on/off switch (e.g., to turn the thermostat on and off).

The widgets provided in the user interfaces may provide a way to present information and status (e.g., associated with home devices 150) by including properties, actions, and graphical representations of home devices 150. In one example implementation, the widgets may provide simple representations for complex devices (e.g., home devices 150). Such an arrangement may enable any home device 150 to be quickly and easily represented by the user interfaces. The user interfaces may enable notifications to be provided (e.g., from home devices 150) to user device 110, and may present a unified view of home devices 150 from servers (e.g., mobile server 120) to clients (e.g., user devices 110 utilizing various platforms). Such an arrangement may save wireless bandwidth, and may minimize delivery of complex device (e.g., home devices 150) information to mobile handsets (e.g., user devices 110).

As shown in FIG. 5, user interface 500 may provide a connected home dashboard that enables a user (e.g., of user device 110) to view and control home devices 150 provided in a connected home (or other area to be controlled). The connected home dashboard may provide a broad view of all home devices 150, and may provide a status of each home device 150. In one example implementation, the connected home dashboard may provide a way to compress and expand information (e.g., associated with home devices 150) in order to optimize the use of limited screen sizes (e.g., provided by user devices 110). As shown in FIG. 5, the connected home dashboard may include a devices/zones item (or widget) 510, a modes item 520, a monitoring item 530, a security item 540, an energy item 550, a notifications item 560, and an activity status section 570.

Devices/zones item 510 may include a selection mechanism (e.g., an icon, a button, or another graphical representation) that, when selected, may provide user interfaces (e.g., such as the user interfaces depicted in FIGS. 6A-6E) that display information associated with home devices 150 and/or one or more zones (e.g., upstairs, downstairs, basement, front porch, etc.) of a home that includes home devices 150. For example, the user interfaces depicted in FIGS. 6A-6E may display representations of home devices 150, and may enable a user to view, manipulate, or control home devices 150 via the representations.

Modes item 520 may include a selection mechanism (e.g., an icon, a button, or another graphical representation) that, when selected, may provide user interfaces (e.g., such as the user interfaces depicted in FIGS. 7A-7D) that display information associated with one or more modes (e.g., home, away, goodnight, etc.) of home devices 150. The modes may enable the user to control multiple home devices 150 via selection of a single mode. For example, the user interfaces depicted in FIGS. 7A-7D may display a graphical representation (e.g., a button) of a home mode that, when selected, may instruct certain home devices 150 to perform certain functions (e.g., the home mode may cause a security system to be deactivated, may turn on lights, may unlock a front door, may open a garage door, etc.).

Monitoring item 530 may include a selection mechanism (e.g., an icon, a button, or another graphical representation) that, when selected, may provide user interfaces (e.g., such as the user interfaces depicted in FIGS. 8A-8C) that display information associated with home devices 150 providing monitoring functions (e.g., surveillance cameras, motion detectors, smoke detectors, etc.). For example, the user interfaces depicted in FIGS. 8A-8C may display representations of surveillance cameras (e.g., home devices 150) provided at different locations of the home, and may enable a user to view, manipulate, or control the surveillance cameras via the representations.

Security item 540 may include a selection mechanism (e.g., an icon, a button, or another graphical representation) that, when selected, may provide user interfaces (e.g., such as the user interfaces depicted in FIGS. 9A-9C) that display information associated with a security system provided in the home (e.g., and the security system's associated home devices 150, such as surveillance cameras, motion detectors, etc.). For example, the user interfaces depicted in FIGS. 9A-9C may display a representation of an arm/disarm switch (e.g., an on/off switch) for the security system, and may enable a user to arm or disarm the security system via the arm/disarm switch representation.

Energy item 550 may include a selection mechanism (e.g., an icon, a button, or another graphical representation) that, when selected, may provide user interfaces (e.g., such as the user interfaces depicted in FIGS. 10A and 10B) that display information associated with home devices 150 that consume energy (e.g., electricity, gas, etc.) or control energy consumption in a home that includes home devices 150. For example, the user interfaces depicted in FIGS. 10A and 10B may display representations of energy consuming home devices 150 (e.g., lights, a heating system, an air conditioning system, etc.) and energy controlling home devices 150 (e.g., thermostats, on/off switches for lights, on/off switches for a heating system, etc.), and may enable a user to view, manipulate, or control such home devices 150 via the representations.

Notifications item 560 may include a selection mechanism (e.g., an icon, a button, or another graphical representation) that, when selected, may provide user interfaces (e.g., such as the user interfaces depicted in FIGS. 11A-11D) that display information associated with notifications provided by home devices 150. For example, the user interfaces depicted in FIGS. 11A-11D may display notifications associated with certain home devices 150, such as a notification (e.g., "Motion detected at front door") provided by a motion detector located at the home's front door. If the user selects such a notification, the user may be presented with information provided by home devices 150 (e.g., a front door surveillance camera or motion detector) located at the front door. Alternatively, or additionally, such notifications may be provided via a status bar provided by user device 110, as described below in connection with the user interfaces of FIGS. 12A-12C.

Activity status section 570 may include a portion of the connected home dashboard that provides information associated with user manipulation of one or more home devices 150. For example, as shown in FIG. 5, at 9:00 am the user may have selected a home mode or "Scene" (e.g., via modes item 520) for home devices 150, and may have set a thermostat to a temperature of 64° F. If the user manipulates one or more home devices 150 after 9:00 am, activity status section 570 may be updated to include information associated with such manipulation. In one example, activity status section 570 may provide a log of all recent home device 150 activities and may enable a user to view current states of all home devices 150 provided in a home.

Although user interface 500 depicts a variety of information, in other implementations, user interface 500 may depict less information, additional information, different information, or differently arranged information than depicted in FIG. 5.

FIGS. 6A-6E are diagrams of example devices/zones user interfaces 600 capable of being generated by one of user devices 110. User interfaces 600 may display information associated with home devices 150 and/or one or more zones (e.g., upstairs, downstairs, basement, front porch, etc.) of a home that includes home devices 150. For example, user interfaces 600 may display representations of home devices 150, and may enable a user to view, manipulate, or control home devices 150 via the representations.

If the user selects devices/zones item 510 of user interface 500 (FIG. 5), a user interface 605 depicted in FIG. 6A may be presented to the user. As shown in FIG. 6A, user interface 605 may include a title section 610, a device selection mechanism 615, and additional device information section 620.

Title section 610 may display a title associated with user interface 605. For example, since user interface 605 is associated with home devices 150 and zones containing home devices 150, title section 610 may include a title "Devices & Zones."

Device selection mechanism 615 may include a selection mechanism (e.g., an icon, a button, or another graphical representation) that, when selected, may provide a menu 625 that enables the user to select one or more home devices 150 (e.g., for viewing, controlling, etc.). As shown in FIG. 6A, menu 625 may include a variety of home devices 150 to choose from, such as all home devices 150 ("All Devices"), home devices 150 located at a back porch ("Back Porch"), home devices 150 located in a basement ("Basement"), home devices 150 located in a dining room ("Dining Room"), home devices 150 located at a front door ("Front Door"), home devices 150 located in a kitchen ("Kitchen"), and home devices 150 located in a living room ("Living Room").

Additional device information section 620 may include one or more graphical representations associated with one or more home devices 150. In one example implementation, additional device information section 620 may be automatically populated by user device 110 (e.g., according to defaults, based on use of home devices 150, etc.). In another example implementation, additional device information section 620 may be configured by the user of user device 110. As shown in FIG. 6A, additional device information section 620 may include information and control mechanisms associated with a basement thermostat, a first floor thermostat, a second floor thermostat, a living room lamp, and a front porch light. The basement thermostat may include control buttons (e.g., up and down arrows) and a digital output (e.g., reading 60° F.). The first floor thermostat may include control buttons (e.g., up and down arrows) and a digital output (e.g., reading 70° F.). The second floor thermostat may include control buttons (e.g., up and down arrows) and a digital output (e.g., reading 75° F.). The living room lamp and the front porch light each may include an on/off switch.

Figure 6B:
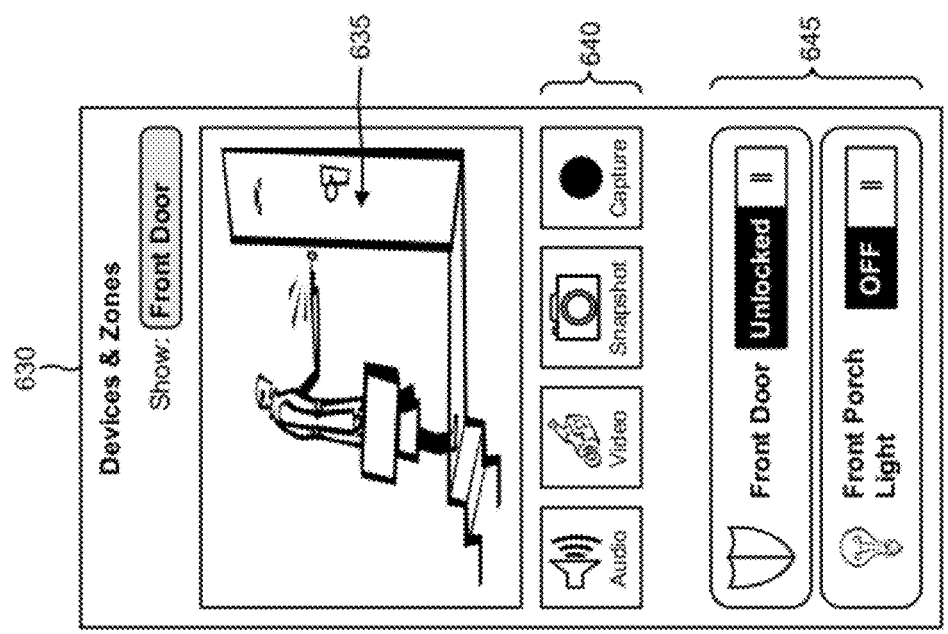

If the user selects device selection mechanism 615, and chooses an entry in menu 625 (e.g., the user chooses "Front Door"), the user may be presented with a user interface 630, as shown in FIG. 6B. User interface 630 may include information associated with home devices 150 provided at or around the home's front door. For example, the front door may include home devices 150, such as a surveillance camera, a sensor for the front door's lock, and a sensor for a front porch light. As shown in FIG. 6B, user interface 630 may include a video display section 635, a control section 640, and other home devices section 645.

Video display section 635 may include live video streamed by a home device 150 (e.g., the surveillance camera) provided at the front door. In one example, the video provided in video display section 635 may include a live video feed provided by the surveillance camera. In another example, the video provided in video display section 635 may include recorded video provided by the surveillance camera.

Control section 640 may include one or more selection mechanisms (e.g., icons, buttons, or other graphical representations) that, when selected, may enable the user to manipulate a home device 150 (e.g., the surveillance camera) provided at the front door. For example, control section 640 may include an audio button that, when selected, may enable the user to listen to audio received by the surveillance camera. Control section 640 may also include a video button that, when selected, may enable the user to view video (e.g., in video display section 635) received by the surveillance camera. Control section 640 may further include a snapshot button that, when selected, may enable user device 110 to capture an image (e.g., a snapshot) received by the surveillance camera. Control section 640 may further include a capture button that, when selected, may enable user device 110 to record video received by the surveillance camera.

Other home devices section 645 may include one or more graphical representations associated with one or more home devices 150 provided at the front door. As shown in FIG. 6B, other home devices section 645 may include information and control mechanisms associated with the front door and a front porch light. The front door may include a switch for unlocking or locking the front door. The front porch light each may include an on/off switch for turning on or off the front porch light.

If the user selects a second floor thermostat item 650 from additional device information section 620 (FIG. 6A), the user may be presented with a user interface 655, as shown in FIG. 6C. As shown in FIG. 6C, user interface 655 may include information and control mechanisms associated with the second floor thermostat. For example, user interface 655 may include control buttons (e.g., up and down arrows) and a digital output (e.g., reading 75° F.) associated with the second floor thermostat. The user may manipulate the control buttons to adjust a set temperature for the second floor thermostat. User interface 655 may also include a cool button (e.g., to enable the second floor thermostat to regulate a temperature provided by an air conditioning system); a heat button (e.g., to enable the second floor thermostat to regulate a temperature provided by a heating system); an auto button (e.g., to enable the second floor thermostat to control whether a fan may be automatically activated); and an off button (e.g., to turn off the second floor thermostat). As further shown in FIG. 6C, user interface 655 may display a temperature (e.g., 85° F.) recorded outside the home, and may provide updates to activity status section 570 (e.g., indicating that, at 2:47 pm, the second floor thermostat's desired temperature was changed to 75° F.).

If the user selects a living room lamp item 660 from additional device information section 620 (FIG. 6A), the user may be presented with a user interface 665, as shown in FIG. 6D. As shown in FIG. 6D, user interface 665 may include information and control mechanisms associated with the living room lamp. For example, user interface 665 may include a graphical representation of the living room lamp (e.g., a light bulb); an on/off switch (e.g., to enable the living room lamp to be turned on or off); and a dimmer control (e.g., to enable the user to control the amount of electricity provided to the living room lamp, which may affect the illumination provided by the living room lamp). As further shown in FIG. 6D, user interface 665 may provide updates to activity status section 570 (e.g., indicating that, at 2:47 pm, the living room lamp had a dimmer level of 40% and was turned on).

Figure 6E:
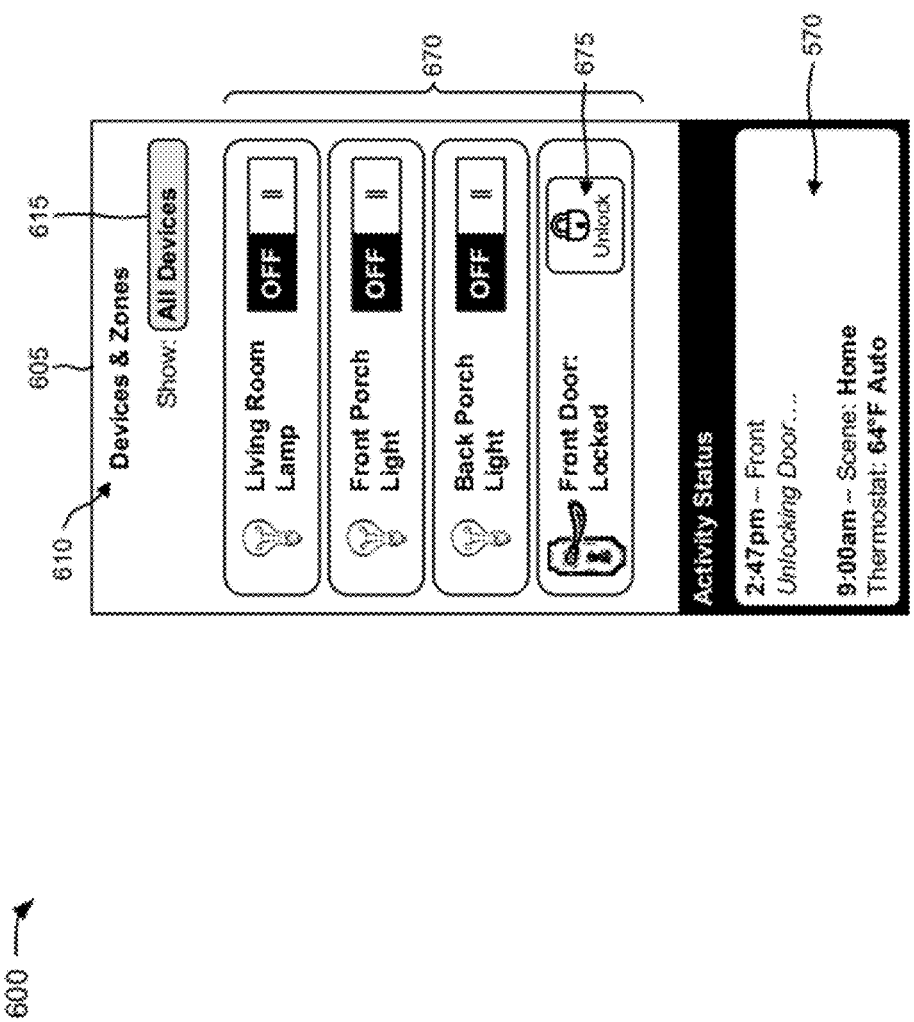

If the user selects devices/zones item 510 of user interface 500 (FIG. 5), an alternative version of user interface 605 (FIG. 6A) may be presented to the user, as depicted in FIG. 6E. As shown in FIG. 6E, the alternative version of user interface 605 may include title section 610, device selection mechanism 615, and an additional device information section 670. Title section 610 and device selection mechanism 615 may include the features described in connection with FIG. 6A.

Additional device information section 670 may include one or more graphical representations associated with one or more home devices 150. In one example implementation, additional device information section 670 may be automatically populated by user device 110 (e.g., according to defaults, based on use of home devices 150, etc.). In another example implementation, additional device information section 670 may be configured by the user of user device 110. As shown in FIG. 6E, additional device information section 670 may include information and control mechanisms associated with a living room lamp, a front porch light, a back porch light, and a front door lock. The living room lamp, the front porch light, and the back porch light each may include an on/off switch. The front door lock may include a mechanism 675 to lock or unlock the front door. For example, as shown in FIG. 6E, the user may manipulate mechanism 675 to unlock the front door. As further shown in FIG. 6E, the alternative version of user interface 605 may provide updates to activity status section 570 (e.g., indicating that, at 2:47 pm, the front door was unlocked via user manipulation of mechanism 675).

Although user interfaces 600 depict a variety of information, in other implementations, user interfaces 600 may depict less information, additional information, different information, or differently arranged information than depicted in FIGS. 6A-6E.

FIGS. 7A-7D are diagrams of example modes user interfaces 700 capable of being generated by one of user devices 110. User interfaces 700 may display information associated with modes of home devices 150 and/or one or more zones (e.g., upstairs, downstairs, basement, front porch, etc.) of a home that includes home devices 150. For example, user interfaces 700 may display modes (e.g., home, away, goodnight, etc.) associated with one or more home devices 150, and may enable a user to view, manipulate, or control the modes. These modes may be defined by a user (e.g., via user device 110) and may be activated by user device 110. The home, away, and goodnight modes are just examples of how modes may be used. In one example implementation, modes may provide a way to group home devices 150 together and to define preset values for their parameters so that when they are activated, home devices 150 defined in a mode may be put into a state defined in mode settings.

If the user selects modes item 520 of user interface 500 (FIG. 5), a user interface 705 depicted in FIG. 7A may be presented to the user. As shown in FIG. 7A, user interface 705 may include a home mode selection mechanism 710, an away mode selection mechanism 715, and a goodnight mode selection mechanism 720.

Home mode selection mechanism 710 may include a selection mechanism (e.g., an icon, a button, or another graphical representation) that, when selected, may activate or deactivate a home mode for home devices 150. When the home mode is activated, certain home devices 150 may be manipulated. For example, one or more lights may be turned on, a garage door may be opened, one or more doors may be unlocked, a security system may be turned off, etc.

Away mode selection mechanism 715 may include a selection mechanism (e.g., an icon, a button, or another graphical representation) that, when selected, may activate or deactivate an away mode for home devices 150. When the away mode is activated, certain home devices 150 may be manipulated. For example, one or more lights may be turned off, a garage door may be closed, one or more doors may be locked, a security system may be turned on, etc.

Goodnight mode selection mechanism 720 may include a selection mechanism (e.g., an icon, a button, or another graphical representation) that, when selected, may activate or deactivate a goodnight mode for home devices 150. When the goodnight mode is activated, certain home devices 150 may be manipulated. For example, one or more lights may be turned off, one or more thermostats may be set to certain temperatures, one or more doors may be locked, one or more televisions may be turned off, a security system may be turned on, etc.

As further shown in FIG. 7A, activity status section 570 may indicate that, at 9:00 am, the away mode was activated, a thermostat was set for 60° F. and automatic, the front door was locked, and the security system was armed (i.e., turned on). If the user wishes to change the selected mode (e.g., the away mode), the user may select home mode selection mechanism 710 or goodnight mode selection mechanism 720. For example, if the user wishes to activate the home mode, the user may select an "Activate" 725 button associated with home mode selection mechanism 710.

Figure 7B:
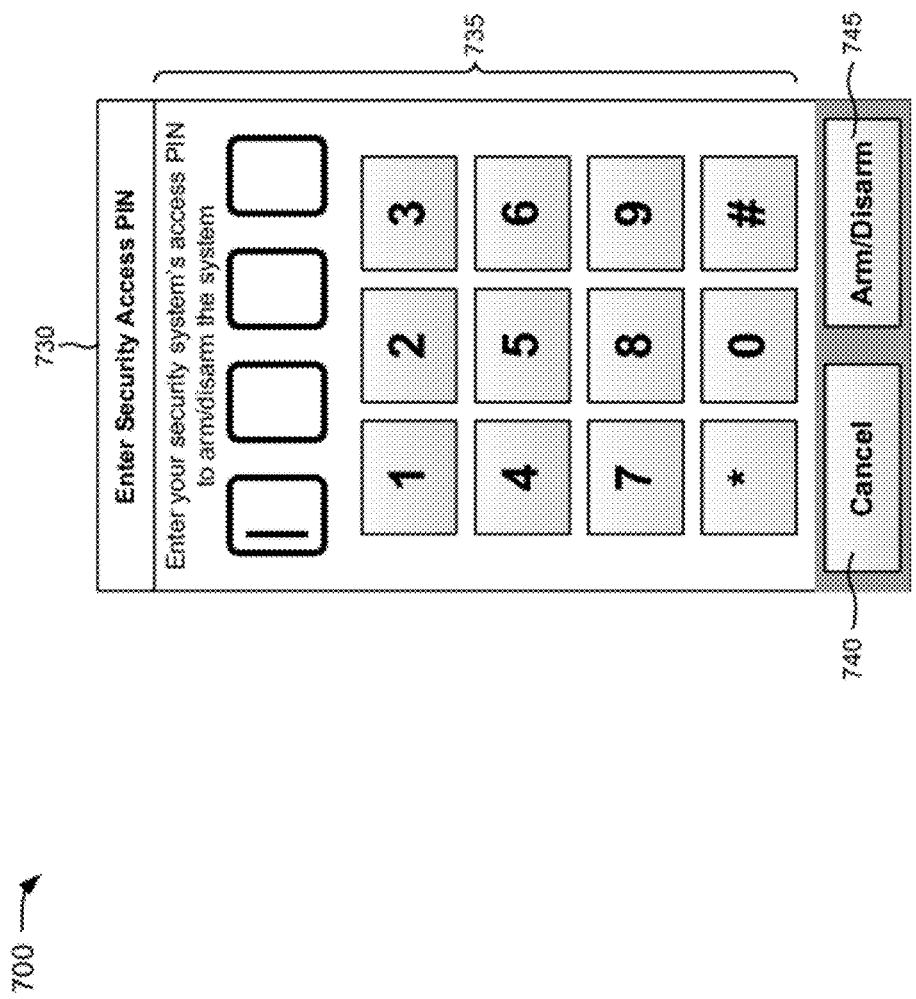

When the user selects "Activate" button 725 (FIG. 7A), the user may be presented with a user interface 730, as shown in FIG. 7B. As shown in FIG. 7B, user interface 730 may include information and control mechanisms associated with activating the home mode. For example, user interface 730 may include a security access entry section 735, a cancel selection mechanism 740, and an arm/disarm selection mechanism 745.

Security access entry section 735 may include a keypad (e.g., a standard telephone keypad) or control buttons that enable the user to enter an access personal identification number (PIN) for activating the home mode. In other implementations, the user may enter different access information (other than a PIN) in order to activate the home mode. As shown in FIG. 7B, the user may select, via security access entry section 735, numbers associated with the user's PIN. After entering the PIN via security access entry section 735, the user may cancel (e.g., via cancel selection mechanism 740) the request to activate the home mode. Alternatively, the user may implement (e.g., via arm/disarm selection mechanism 745) the request to activate the home mode.

Cancel selection mechanism 740 may include a selection mechanism (e.g., an icon, a button, or another graphical representation) that, when selected, may cause user device 110 to cancel the request to activate the home mode.

Arm/disarm selection mechanism 745 may include a selection mechanism (e.g., an icon, a button, or another graphical representation) that, when selected, may cause user device 110 to determine whether the PIN (e.g., entered via security access entry section 735) is valid. If user device 110 determines that the PIN is valid (e.g., via interaction with one or more devices of network 100), user device 110 implement the request to activate the home mode.

Figure 7C:
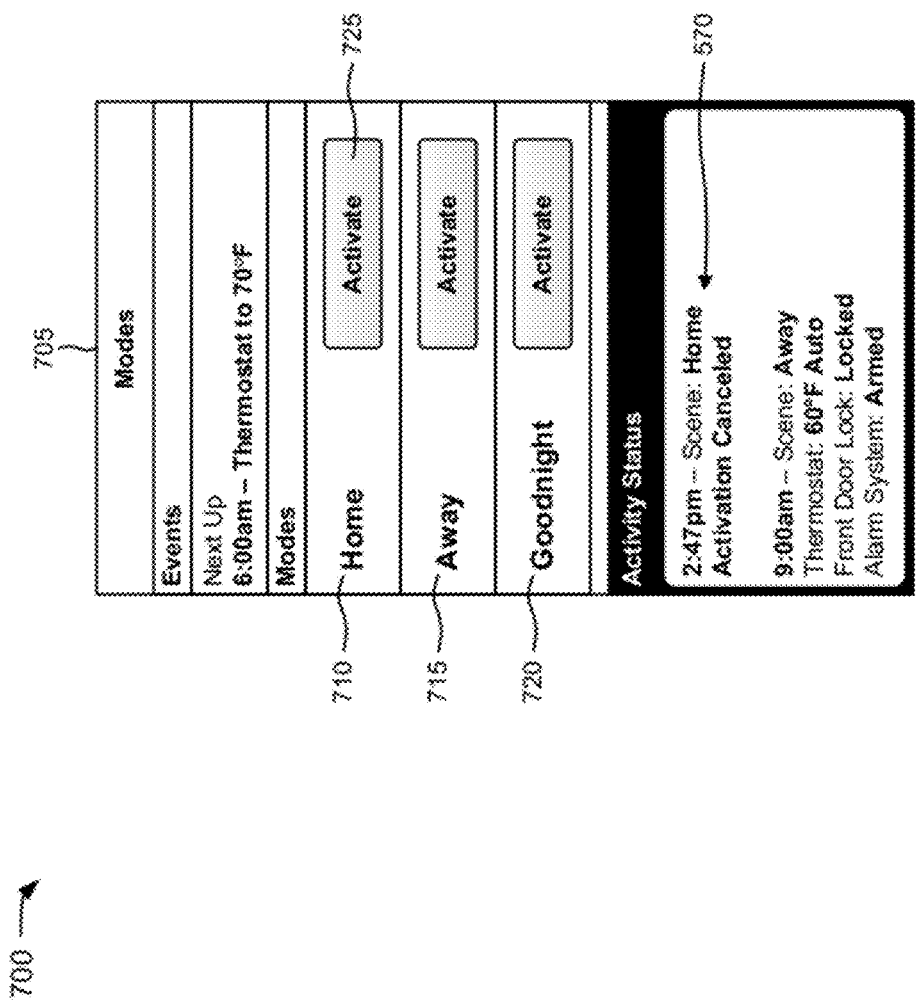

In one example, if the user selects cancel selection mechanism 740 (FIG. 7B), the user may be presented with an alternative version of user interface 705, as shown in FIG. 7C. As shown in FIG. 7C, the alternative version of user interface 705 may include the features described above in connection with user interface 705 (FIG. 7A). However, since the user selected cancel selection mechanism 740, activity status section 570 may be updated (e.g., in the alternative version of user interface 705) to indicate that, at 2:47 pm, the request to activate the home mode was canceled.

In another example, if the user selects arm/disarm selection mechanism 745 (FIG. 7B), the user may be presented with another alternative version of user interface 705, as shown in FIG. 7D. As shown in FIG. 7D, the other alternative version of user interface 705 may include the features described above in connection with user interface 705 (FIG. 7A). However, since the user selected arm/disarm selection mechanism 745, activity status section 570 may be updated (e.g., in the other alternative version of user interface 705) to indicate that, at 2:47 pm, the home mode was activated. As further shown in FIG. 7D, activity status section 570 may also be updated to indicate that a thermostat may be set for 68° F. and automatic, the front door may be unlocked, and the security system may be disarmed (i.e., turned off).

Although user interfaces 700 depict a variety of information, in other implementations, user interfaces 700 may depict less information, additional information, different information, or differently arranged information than depicted in FIGS. 7A-7D.

FIGS. 8A-8C are diagrams of example monitoring user interfaces 800 capable of being generated by one of user devices 110. User interfaces 800 may display information and/or control mechanisms associated with home devices 150 used for monitoring conditions of the home (e.g., surveillance cameras, smoke detectors, etc.). For example, user interfaces 800 may display images received from one or more surveillance cameras, and may enable a user to view, manipulate, or control the surveillance cameras.

If the user selects monitoring item 530 of user interface 500 (FIG. 5), a user interface 805 depicted in FIG. 8A may be presented to the user. As shown in FIG. 8A, user interface 805 may include video 810 (or images) received by a camera located at a back porch of the home, video 815 (or images) received by a camera located at a front door of the home, video 820 (or images) received by a camera located at a driveway of the home, and video 825 (or images) received by a camera located at a backyard of the home. As further shown in FIG. 8A, the cameras located at the back porch, driveway, and the front door may be operational, and the camera located at the backyard may be non-operational (i.e., offline).

The user may select one of videos 810-825 in order to see larger video (or image) information and/or to see information associated with the camera capturing one of videos 810-825. For example, if the user selects video 810 of user interface 805 (FIG. 8A), a user interface 830 depicted in FIG. 8B may be presented to the user. As shown in FIG. 8B, user interface 830 may include a secondary video section 835, a primary video section 840, and a control section 845.

Secondary video section 835 may include video information received from cameras other than a camera being viewed or controlled (e.g., the camera located at the front door). For example, secondary video section 835 may include video 810 (or images) received by the camera located at the back porch, video 820 (or images) received by the camera located at the driveway, and video 825 (or images) received by the camera located at the backyard.

Primary video section 840 may include video information received from the camera being viewed or controlled (e.g., the camera located at the front door). For example, primary video section 840 may include a larger sized version of video 815 (or images) received by the camera located at the front door. As further shown in FIG. 8B, primary video section 840 may include a status (e.g., "Active") of the camera located at the front door, and a view preset or mode (e.g., "Home").

Control section 845 may include selection mechanisms (e.g., icons, buttons, or other graphical representations) that, when selected, may activate or deactivate a particular function of the camera located at the front door. For example, control section 845 may include an audio selection mechanism that, when selected, may enable the user to hear the audio captured by the front door camera; a video selection mechanism 850 (which may be currently selected) that, when selected, may enable the user to view the video captured by the front door camera; a snapshot mechanism that, when selected, may enable user device 110 to capture and store an image received by the front door camera; and a capture mechanism 855 that, when selected, may enable user device 110 to record and store the video received by the front door camera.

If the user selects capture mechanism 855, a user interface 860 depicted in FIG. 8C may be presented to the user. As shown in FIG. 8C, user interface 860 may include secondary video section 835 and primary video section 840. Secondary video section 835 and primary video section 840 may include the features described above in connection with FIG. 8B. As further shown in FIG. 8C, user interface 860 may include a stop recording mechanism 865.

Stop recording mechanism 865 may include a selection mechanism (e.g., an icon, a button, or another graphical representation) that, when selected, may cause user device 110 to stop recording the video received by the front door camera.

For example, as shown in FIG. 8C, stop recording mechanism 865 may indicate that 2:34 minutes of the video received by the front door camera was recorded by user device 110. As further shown in FIG. 8C, when stop recording mechanism 865 is selected by the user, a window 870 may be displayed that enables the user to save the recorded video (e.g., to user device 110) or to cancel saving of the recorded video.

Although user interfaces 800 depict a variety of information, in other implementations, user interfaces 800 may depict less information, additional information, different information, or differently arranged information than depicted in FIGS. 8A-8C.

Figure 9A:
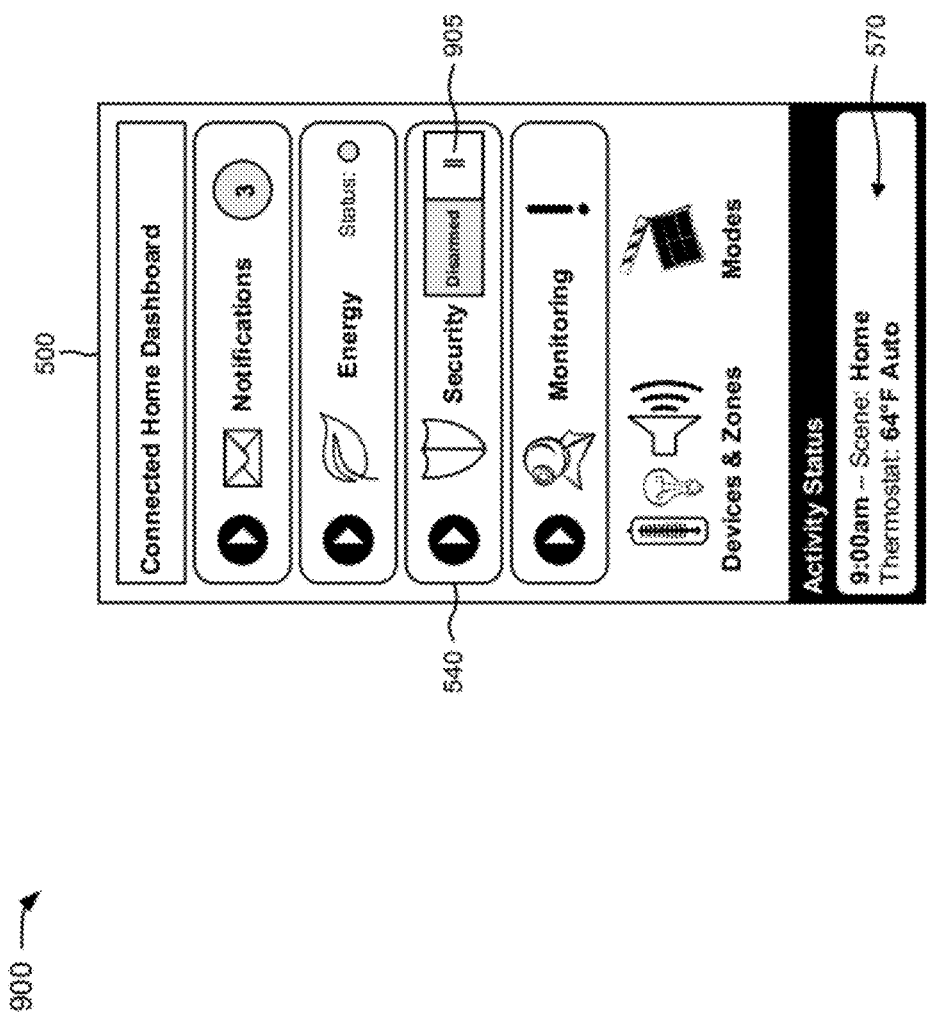
Figure 9C:
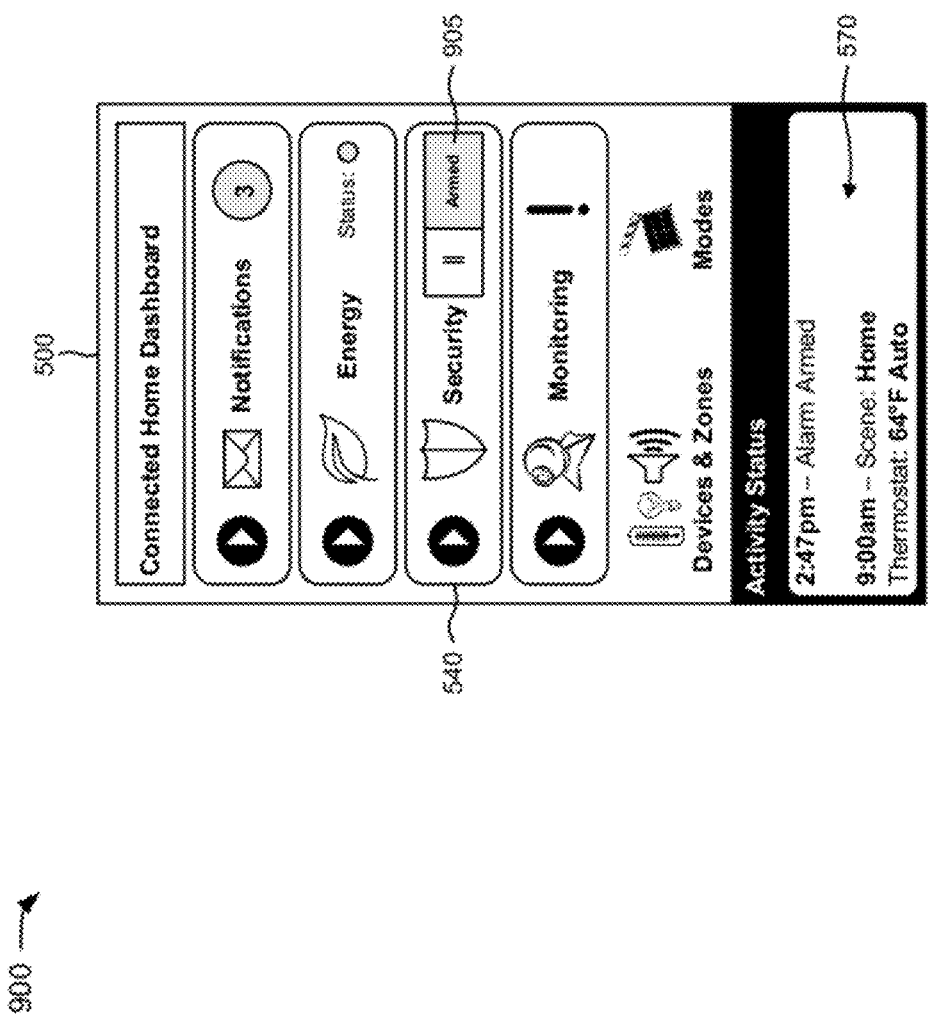

FIGS. 9A-9C are diagrams of example security user interfaces 900 capable of being generated by one of user devices 110. User interfaces 900 may display information and/or control mechanisms associated with home devices 150 used for a security system in the home. For example, user interfaces 900 may display mechanisms that may enable a user to view, manipulate, or control the security system.

For example, as shown in FIG. 9A, user interface 500 (e.g., described above in connection with FIG. 5) may be displayed to the user and may include security item 540 and activity status section 570. Security item 540 and activity status item 570 may include the features described above in connection with FIG. 5. As further shown in FIG. 9A, security item 540 may include an arm/disarm switch 905 that may enable the user to arm or disarm the security system and its associated home devices 150. As shown, arm/disarm switch 905 may be in a disarmed position, which may indicate that the security system is disarmed.

If the user wishes to arm the security system, the user may manipulate arm/disarm switch 905 and a user interface 910 depicted in FIG. 9B may be presented to the user. As shown in FIG. 9B, user interface 910 may include information and control mechanisms associated with activating the security system. For example, user interface 910 may include a security access entry section 915, a cancel selection mechanism 920, and an arm/disarm selection mechanism 925.

Security access entry section 915 may include a keypad (e.g., a standard telephone keypad) or control buttons that enable the user to enter an access PIN for arming or disarming the security system and its associated home devices 150. In other implementations, the user may enter different access information (other than a PIN) in order to arm/disarm the security system. As shown in FIG. 9B, the user may select, via security access entry section 915, numbers associated with the user's PIN. After entering the PIN via security access entry section 915, the user may cancel (e.g., via cancel selection mechanism 920) the request to arm/disarm the security system. Alternatively, the user may implement (e.g., via arm/disarm selection mechanism 915) the request to arm/disarm the security system.

Cancel selection mechanism 920 may include a selection mechanism (e.g., an icon, a button, or another graphical representation) that, when selected, may cause user device 110 to cancel the request to arm/disarm the security system.

Arm/disarm selection mechanism 925 may include a selection mechanism (e.g., an icon, a button, or another graphical representation) that, when selected, may cause user device 110 to determine whether the PIN (e.g., entered via security access entry section 915) is valid. If user device 110 determines that the PIN is valid (e.g., via interaction with one or more devices of network 100), user device 110 implement the request to arm/disarm the security system.

In one example, if the user selects arm/disarm selection mechanism 925 (FIG. 9B), the user may be presented with an alternative version of user interface 500, as shown in FIG. 9C.

As shown in FIG. 9C, the alternative version of user interface 500 may include the features described above in connection with user interface 500 (FIGS. 5 and 9A). However, since the user selected arm/disarm selection mechanism 925, arm/disarm switch 905 may be updated to an armed position, which may indicate that the security system is armed. As further shown in FIG. 9C, activity status section 570 may be updated (e.g., in the alternative version of user interface 500) to indicate that, at 2:47 pm, the security system was armed by the user.

Although user interfaces 900 depict a variety of information, in other implementations, user interfaces 900 may depict less information, additional information, different information, or differently arranged information than depicted in FIGS. 9A-9C.

FIGS. 10A and 10B are diagrams of example energy user interfaces 1000 capable of being generated by one of user devices 110. User interfaces 1000 may display information and/or control mechanisms associated with home devices 150 that consume energy (e.g., electricity, gas, etc.) or control energy consumption in a home that includes home devices 150. For example, user interfaces 1000 may display mechanisms that may enable a user to view, manipulate, or control electricity used by home devices 150, heating and/or air conditioning systems, hot water systems, etc.

If the user selects energy item 550 of user interface 500 (FIG. 5), a user interface 1005 depicted in FIG. 10A may be presented to the user. As shown in FIG. 10A, user interface 1005 may include an expanded version of energy item 550, and may include notifications item 560 and activity status section 570. Notifications item 560 and activity status section 570 may include the features described above in connection with FIG. 5. The expanded version of energy item 550 may include a total home energy usage indicator 1010, an outside temperature indicator 1015, a basement thermostat indicator 1020, a first floor thermostat indicator 1025, and a second floor thermostat indicator 1030.

Total home energy usage indicator 1010 may provide an indication of energy consumed by home devices 150 over a predetermined time period (e.g., a day, a week, etc.), a rate of energy consumption by home devices 150 over a predetermined time period, a cost of energy consumed by home devices 150 over a predetermined time period, etc. For example, as shown in FIG. 10A, total home energy usage indicator 1010 may indicate that $0.11/KWh of energy is being consumed by home devices 150.

Outside temperature indicator 1015 may provide an indication of a temperature outside of the home (e.g., as determined by a thermometer associated with the home). For example, as shown in FIG. 10A, outside temperature indicator 1015 may indicate that it is 85° F. outside of the home.

Basement thermostat indicator 1020 may provide an indication of a temperature that is measured by a basement thermostat. For example, as shown in FIG. 10A, basement thermostat indicator 1020 may include a digital output reading 60° F.

First floor thermostat indicator 1025 may provide an indication of a temperature that is measured by a first floor thermostat. For example, as shown in FIG. 10A, first floor thermostat indicator 1025 may include a digital output reading 70° F.

Second floor thermostat indicator 1030 may provide an indication of a temperature that is measured by a second floor thermostat. For example, as shown in FIG. 10A, second floor thermostat indicator 1030 may include a digital output reading 75° F.

If the user selects basement thermostat indicator 1020 of user interface 1005 (FIG. 10A), the user may be presented with a user interface 1035, as shown in FIG. 10B. As shown in FIG. 10B, user interface 1035 may include information and control mechanisms associated with the basement thermostat. For example, user interface 1035 may include control buttons (e.g., an up arrow 1040 and a down arrow 1045) and a digital output 1050 (e.g., reading 60° F.) associated with the basement thermostat. The user may manipulate up arrow 1040 and down arrow 1045 to adjust a set temperature for the basement thermostat. User interface 1035 may also include a control button section 1055 that may be used to further control the basement thermostat. Control button section 1055 may include, for example: a cool button (e.g., to enable the basement thermostat to regulate a temperature provided by an air conditioning system); a heat button (e.g., to enable the basement thermostat to regulate a temperature provided by a heating system); an auto button (e.g., to enable the basement thermostat to control whether a fan may be automatically activated); and an off button (e.g., to turn off the basement thermostat). As further shown in FIG. 10B, user interface 1035 may display a temperature (e.g., 85° F.) recorded outside the home, and may provide updates to activity status section 570 (e.g., indicating that, at 2:47 pm, the basement thermostat's desired temperature was changed to 65° F.).

Although user interfaces 1000 depict a variety of information, in other implementations, user interfaces 1000 may depict less information, additional information, different information, or differently arranged information than depicted in FIGS. 10A and 10B.

FIGS. 11A-11D are diagrams of example notification user interfaces 1100 capable of being generated by one of user devices 110. User interfaces 1100 may display information associated with notifications provided by home devices 150. For example, user interfaces 1100 may display mechanisms that may enable a user to view, manipulate, or control notifications associated with certain home devices 150, such as a notification (e.g., "Motion detected at front door") provided by a motion detector located at the home's front door.

If the user selects notifications item 560 of user interface 500 (FIG. 5), a user interface 1105 depicted in FIG. 11A may be presented to the user. As shown in FIG. 11A, user interface 1105 may include a notification selection mechanism 1110, a notification 1115 associated with the front door, a notification 1120 associated with a monthly electric budget, and a notification 1125 associated with the back porch.

Notification selection mechanism 1110 may include a selection mechanism (e.g., an icon, a button, or another graphical representation) that, when selected, may provide a menu that enables the user to select one or more notifications (e.g., for viewing, controlling, etc.). As shown in FIG. 11A, the menu may include an entry for viewing all of the pending notifications (e.g., "All Messages"). Since "All Messages" is selected in notification selection mechanism 1110, notifications 1115-1125 may constitute all of the pending notifications.

Figure 11B:
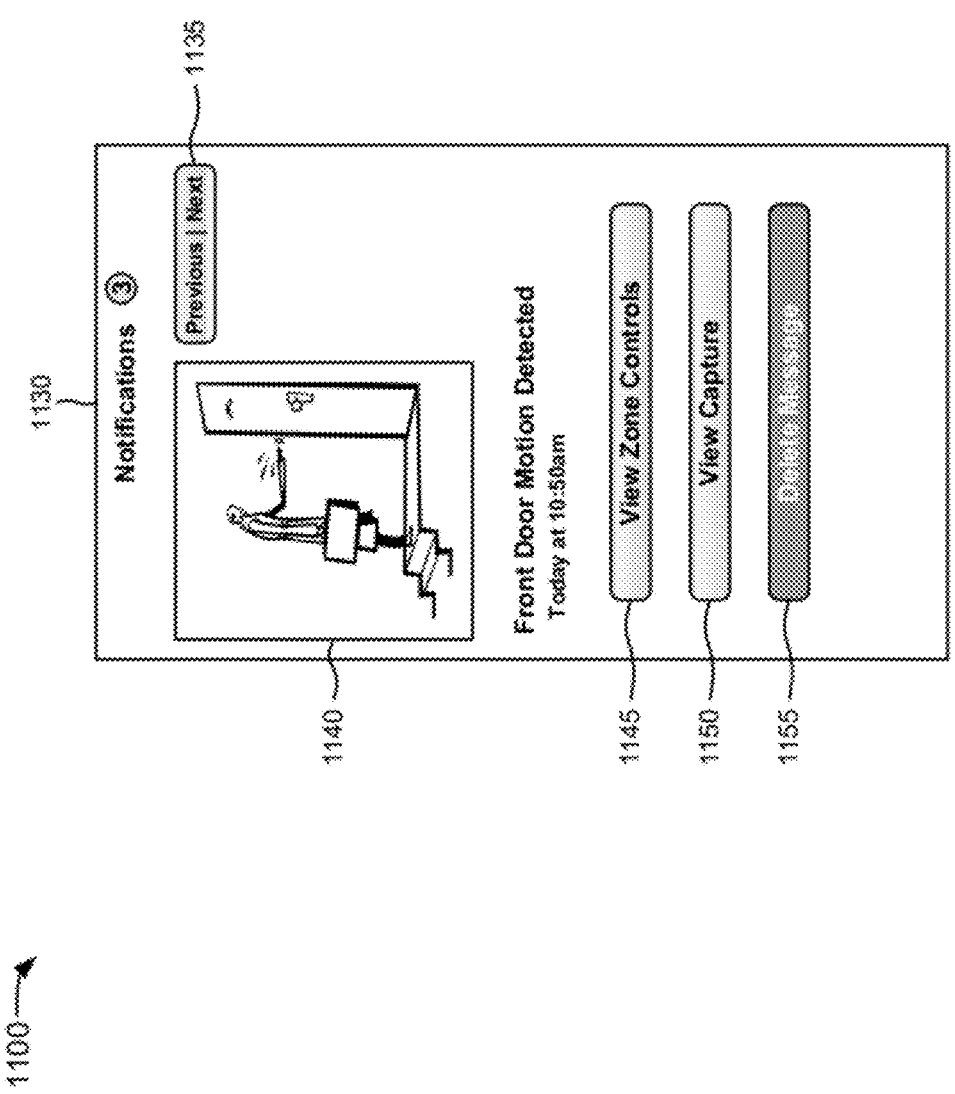

Notification 1115 may include a notification associated with a home device 150 (e.g., a motion detector) provided at the front door. For example, as shown in FIG. 11A, notification 1115 may indicate that the motion detector detected motion at the front door at 10:50 am. If the user selects notification 1115, information associated with the front door motion detector may be provided to the user, as described below in connection with FIGS. 11B-11D.

Notification 1120 may include a notification associated with a monthly electric budget for the home. For example, as shown in FIG. 11A, notification 1120 may indicate that the home is 5% over the monthly electric budget as of 8:34 am. Such information may enable the user to monitor and control electric usage in the home. If the user selects notification 1120, further information associated with the monthly electric budget (e.g., where electric usage is the highest, lowest, etc.) may be provided to the user.

Notification 1125 may include a notification associated with a home device 150 (e.g., a motion detector) provided at the back porch. For example, as shown in FIG. 11A, notification 1125 may indicate that the motion detector detected motion at the back porch at 9:00 am. If the user selects notification 1125, information associated with the back porch door motion detector may be provided to the user.

If the user selects notification 1115 of user interface 1105 (FIG. 11A), a user interface 1130 depicted in FIG. 11B may be presented to the user. As shown in FIG. 11B, user interface 1130 may include a notification selection mechanism 1135, a video 1140, a view zone controls selection mechanism 1145, a view capture selection mechanism 1150, and a delete message selection mechanism 1150.

Notification selection mechanism 1135 may include a selection mechanism (e.g., an icon, a button, or another graphical representation) that, when selected, may enable the user to select a previous notification or a next notification (e.g., for viewing, controlling, etc.).

Video 1140 may include a video (or images) captured by a camera provided at the front door. In one example implementation, video 1140 may include the features of primary video section 840 described above in connection with FIG. 8B.

View zone controls selection mechanism 1145 may include a selection mechanism (e.g., an icon, a button, or another graphical representation) that, when selected, may enable the user to view control mechanisms associated with home devices 150 provided at a zone (e.g., the front door). For example, view zone controls selection mechanism 1145 may enable the user to view control mechanisms associated with the front door lock, a motion detector provided at the front door, the camera provided at the front door, etc.

View capture selection mechanism 1150 may include a selection mechanism (e.g., an icon, a button, or another graphical representation) that, when selected, may enable the user to view control mechanisms associated with the camera provided at the front door.

Delete message selection mechanism 1155 may include a selection mechanism (e.g., an icon, a button, or another graphical representation) that, when selected, may enable the user to delete a notification currently being viewed, i.e., notification 1115 ("Front Door Motion Detected").

Figure 11C:
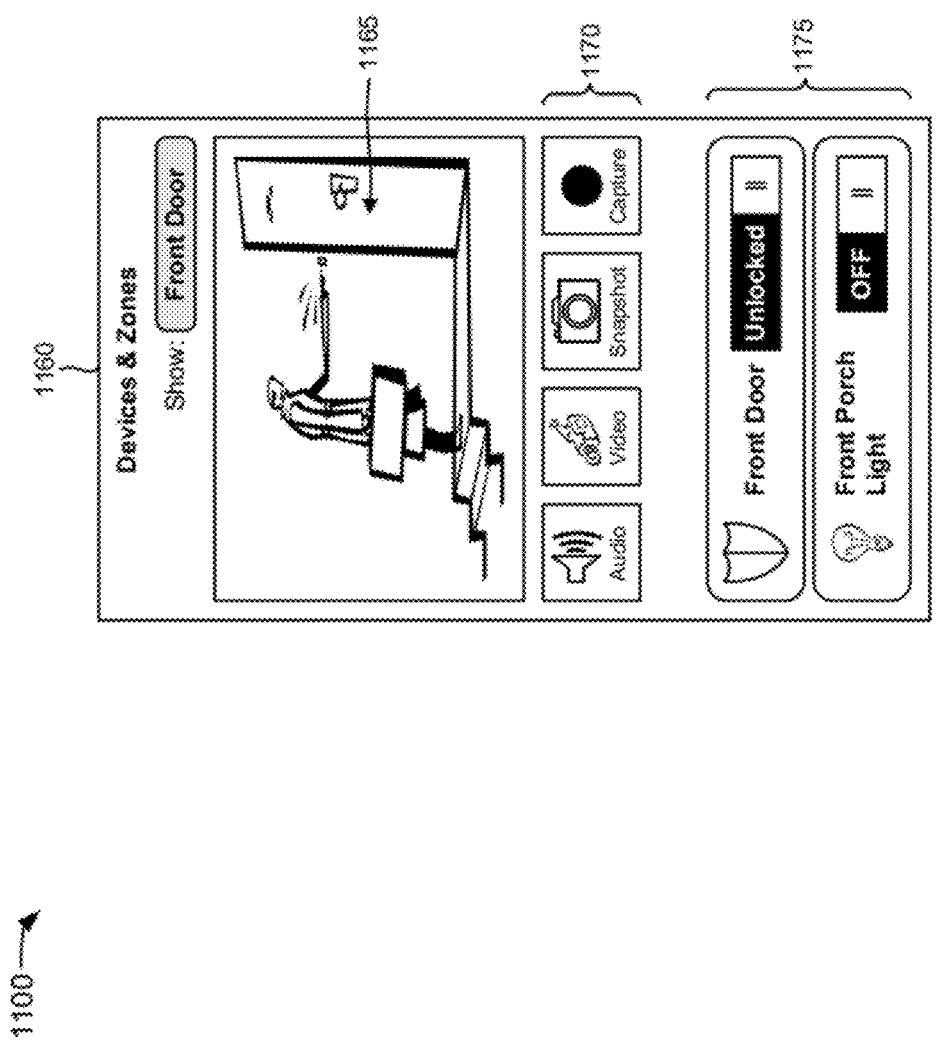

If the user selects view zone controls selection mechanism 1145 of user interface 1130 (FIG. 11B), a user interface 1160 depicted in FIG. 11C may be presented to the user. As shown in FIG. 11C, user interface 1160 may include a video section 1165, a control section 1170, and other devices section 1175.

Video section 1165 may include video information received from the camera being viewed or controlled (e.g., the camera located at the front door). For example, video section 1165 may include a larger sized version of video 1140 (or images) received by the camera located at the front door.

Control section 1170 may include selection mechanisms (e.g., icons, buttons, or other graphical representations) that, when selected, may activate or deactivate a particular function of the camera located at the front door. For example, control section 1170 may include an audio selection mechanism that, when selected, may enable the user to hear the audio captured by the front door camera; a video selection mechanism that, when selected, may enable the user to view the video captured by the front door camera; a snapshot mechanism that, when selected, may enable user device 110 to capture and store an image received by the front door camera; and a capture mechanism that, when selected, may enable user device 110 to record and store the video received by the front door camera.

Other devices section 1175 may include information associated with other home devices 150 provided at the front door. For example, as shown in FIG. 11C, other devices section 1175 may include information and control mechanisms associated with a front door lock (i.e., "Unlocked") and a front porch light (i.e., "Off").

If the user selects view capture selection mechanism 1150 of user interface 1130 (FIG. 11B), a user interface 1180 depicted in FIG. 11D may be presented to the user. As shown in FIG. 11D, user interface 1180 may include a video section 1185, a control section 1190, and a capture options section 1195.

Video section 1185 may include recorded video information received from a recording camera (e.g., the camera located at the front door). For example, video section 1185 may include a larger sized version of video 1140 (or images) received by the camera located at the front door.

Control section 1190 may include control mechanisms (e.g., icons, buttons, or other graphical representations) that, when selected, may pause, stop, play, fast forward, or rewind the recorded video displayed in video section 1185. As shown in FIG. 11D, control section 1190 may include a counter that displays time information associated with the recorded video displayed in video section 1185.

Capture options section 1195 may include selection mechanisms (e.g., icons, buttons, or other graphical representations) that, when selected, may enable the user to perform functions on the recorded video displayed in video section 1185. For example, as shown in FIG. 11D, capture options section 1195 may include a save capture option that enables user device 110 to store the recorded video; a send capture option that enables the user (e.g., via user device 110) to send the recorded video to another device (e.g., another user device 110) or person (e.g., an email recipient, a text message recipient, an instant message recipient, etc.); and a delete capture option that enables user device to delete the recorded video.

Although user interfaces 1100 depict a variety of information, in other implementations, user interfaces 1100 may depict less information, additional information, different information, or differently arranged information than depicted in FIGS. 11A-11D.

Figure 12B:
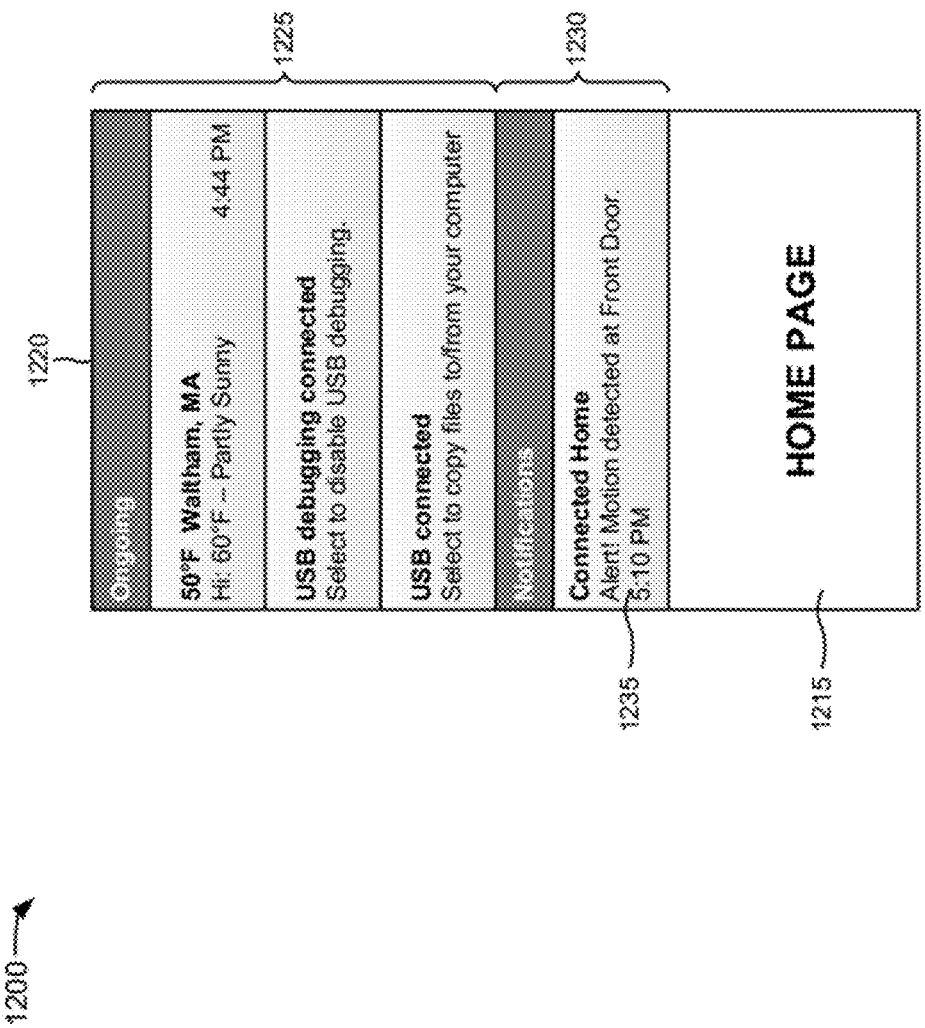
Figure 12C:
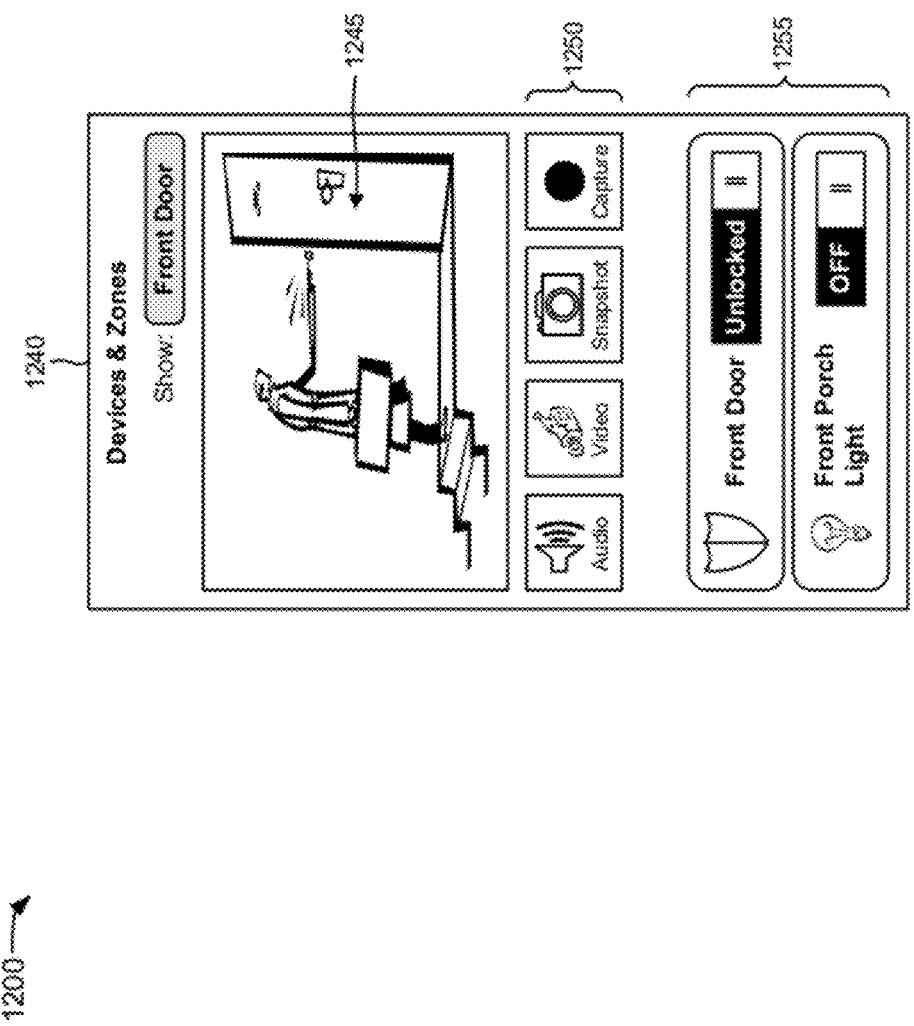

FIGS. 12A-12C are diagrams of other example notification user interfaces 1200 capable of being generated by one of user devices 110. User interfaces 1200 may display information associated with notifications or alerts (e.g., SMS messages) provided by home devices 150. For example, user interfaces 1100 may display mechanisms that may enable a user to view, manipulate, or control notifications associated with certain home devices 150, such as a notification (e.g., "Motion detected at front door") provided by a motion detector located at the home's front door.

As shown in FIG. 12A, a user interface 1205 may be presented to the user of user device 110. User interface 1205 may include a notification 1210 associated with the front door, and a home page 1215.

Notification 1210 may include a notification (e.g., an alert provided via a SMS message) associated with a home device 150 (e.g., a motion detector) provided at the front door. For example, as shown in FIG. 12A, notification 1210 may indicate that motion was detected. If the user selects notification 1210, information associated with the front door motion detector may be provided to the user, as described below in connection with FIGS. 12B and 12C. In one example implementation, notification 1210 may include a SMS alert provided in a status bar of a home page (e.g., home page 1215).

Home page 1215 may include a home page capable of being generated by user device 110. Home page 1215 may include a variety of information, such as an email application, an Internet browser application, a telephone application, a media player, a channel guide, etc.

If the user selects notification 1210 of user interface 1205 (FIG. 12A), a user interface 1220 depicted in FIG. 12B may be presented to the user. As shown in FIG. 12B, user interface 1220 may include a pull down menu with a notification section 1225 associated with user device 110 and a notification section 1230 associated with the connected home. Notification sections 1225 and 1230 may be provided over top of home page 1215 and may cover a portion of home page 1215.

Notification section 1225 may include one or more notifications (e.g., alerts provided via SMS messages) associated with user device 110. For example, as shown in FIG. 12B, notification section 1225 may include a notification associated with the weather (e.g., it is 50° F. in Waltham, Mass. at 4:44 PM); a notification associated with debugging a uniform serial bus (USB) of user device 110 (e.g., "USB debugging connected"); and a notification associated with a USB connection of user device 110 (e.g., "USB connected").

Notification section 1230 may include one or more notifications (e.g., alerts provided via SMS messages) associated with home devices 150 of the connected home. For example, as shown in FIG. 12B, notification section 1230 may include a notification 1235 associated with a motion detector provided at the front door (e.g., "Alert! Motion detected at Front Door").

If the user selects notification 1235 of user interface 1220 (FIG. 12B), a user interface 1240 depicted in FIG. 12C may be presented to the user. As shown in FIG. 12C, user interface 1240 may include a video section 1245, a control section 1250, and other devices section 1255.

Video section 1245 may include information received from a camera located at the front door. For example, video section 1245 may include video (or images) received by the camera located at the front door.

Control section 1250 may include selection mechanisms (e.g., icons, buttons, or other graphical representations) that, when selected, may activate or deactivate a particular function of the camera located at the front door. For example, control section 1250 may include an audio selection mechanism that, when selected, may enable the user to hear the audio captured by the front door camera; a video selection mechanism that, when selected, may enable the user to view the video captured by the front door camera; a snapshot mechanism that, when selected, may enable user device 110 to capture and store an image received by the front door camera; and a capture mechanism that, when selected, may enable user device 110 to record and store the video received by the front door camera.

Other devices section 1255 may include information associated with other home devices 150 provided at the front door. For example, as shown in FIG. 12C, other devices section 1255 may include information and control mechanisms associated with a front door lock (i.e., "Unlocked") and a front porch light (i.e., "Off").

Although user interfaces 1200 depict a variety of information, in other implementations, user interfaces 1200 may depict less information, additional information, different information, or differently arranged information than depicted in FIGS. 12A-12C.

FIG. 13 is a diagram of example operations capable of being performed by an example portion 1300 of network 100. As shown, example network portion 1300 may include user devices 110, backend server 130, home devices 150, and service providers 160. User devices 110, backend server 130, home devices 150, and service providers 160 may include the features described above in connection with, for example, one or more of FIGS. 1-12C.

As further shown in FIG. 13, home devices 150 may generate and provide home device information 180 to one or more service providers 160. Service provider(s) 160 may provide home device information 180 to backend server 130, and backend server 130 may provide home device information 180 to one or more user devices 110. User device(s) 110 may receive home device information 180, and may create a connected home dashboard 1310 (e.g., user interface 500 described above in connection with FIG. 5) based on home device information 180. As described above in connection with FIG. 5, connected home dashboard 1310 may include devices/zones item (or widget) 510, modes item 520, monitoring item 530, security item 540, energy item 550, notifications item 560, and activity status section 570. As shown in FIG. 13, user device(s) 110 may provide connected home dashboard 1310 to a user of user device(s) 110.

Backend server 130 may determine, based on home device information 180, if notifications 1320 are needed for one or more of home devices 150. For example, if a home device 150 (e.g., a light) is left on in the home during the goodnight mode, backend server 130 may determine that a notification about the light should be provided to user devices 110. In another example, if a home device 150 (e.g., a smoke detector) detects smoke, backend server 130 may determine that a notification about the detected smoke should be provided to user devices 110. If notifications 1320 are needed for one or more home devices 150, backend server 130 may generate notifications 1320 and may provide notifications 1310, with home device information 180, to user devices 110. If notifications 1320 are not needed for one or more home devices 150, backend server 130 may only provide home device information 180 to use devices 110.

As further shown in FIG. 13, the user may select one of the items (e.g., items 510-560) of connected home dashboard 1310, may select one of notifications 1320, or may provide other inputs to user device(s) 110, as indicated by reference number 1330. In one example implementation, if the user selects devices/zones item 510 from connected home dashboard 1310, user device(s) 110 may display information associated with one or more home devices 110, as described above in connection with FIGS. 6A-6E. If the user selects modes item 520 from connected home dashboard 1310, user device(s) 110 may display information associated with modes of home devices 150, as described above in connection with FIGS. 7A-7D. If the user selects monitoring item 530 from connected home dashboard 1310, user device(s) 110 may display information provided by audio/visual home devices 150 (e.g., cameras), as described above in connection with FIGS. 8A-8C. If the user selects security item 540 from connected home dashboard 1310, user device(s) 110 may display information associated with a home security system, as described above in connection with FIGS. 9A-9C. If the user selects energy item 550 from connected home dashboard 1310, user device(s) 110 may display information associated with HVAC home devices 150, electric home devices 150, and/or thermostats, as described above in connection with FIGS. 10A and 10B. If the user selects notifications item 560 from connected home dashboard 1310, user device(s) 110 may display information associated with notifications generated by home devices 150, as described above in connection with FIGS. 11A-11D.

In another example implementation, user device(s) 110 may create a home device control request 1340 based on selection/input 1330, and may provide home device control request 1340 to backend server 130. Home device control request 1340 may include a request to view information associated with, to control, or to otherwise manipulate one or more home devices 150. For example, home device control request 1340 may depend on which of items 510-560 the user selected from connected home dashboard 1310. Backend server 130 may provide home device control request 1340 to service providers 160, and service providers 160 may provide home device control request 1340 to one or more home devices 150.

Home device(s) 150 may receive home device control request 1340, and may perform an action (if any) requested by home device control request 1340, as indicated by reference number 1350. For example, if home device control request 1340 includes a request to adjust a particular thermostat set temperature, the particular thermostat may adjust its set temperature based on home device control request 1340. Home devices 150 may generate updated home device information 1360 based on home device action 1350, and may provide updated home device information 1360 to one or more service providers 160. Service provider(s) 160 may provide updated home device information 1360 to backend server 130, and backend server 130 may provide updated home device information 1360 to one or more user devices 110. Updated home device information 1360 may include home device information 180 and any updates provided to information 180 based on home device action 1350. User device(s) 110 may modify connected home dashboard 1310 based on updated home device information 1360, and may display the modified connected home dashboard 1310 to the user.

Although FIG. 13 shows example components of network portion 1300, in other implementations, network portion 1300 may contain fewer components, different components, differently arranged components, or additional components than depicted in FIG. 13. In still other implementations, one or more components of network portion 1300 may perform one or more other tasks described as being performed by one or more other components of network portion 1300.

Figure 14:
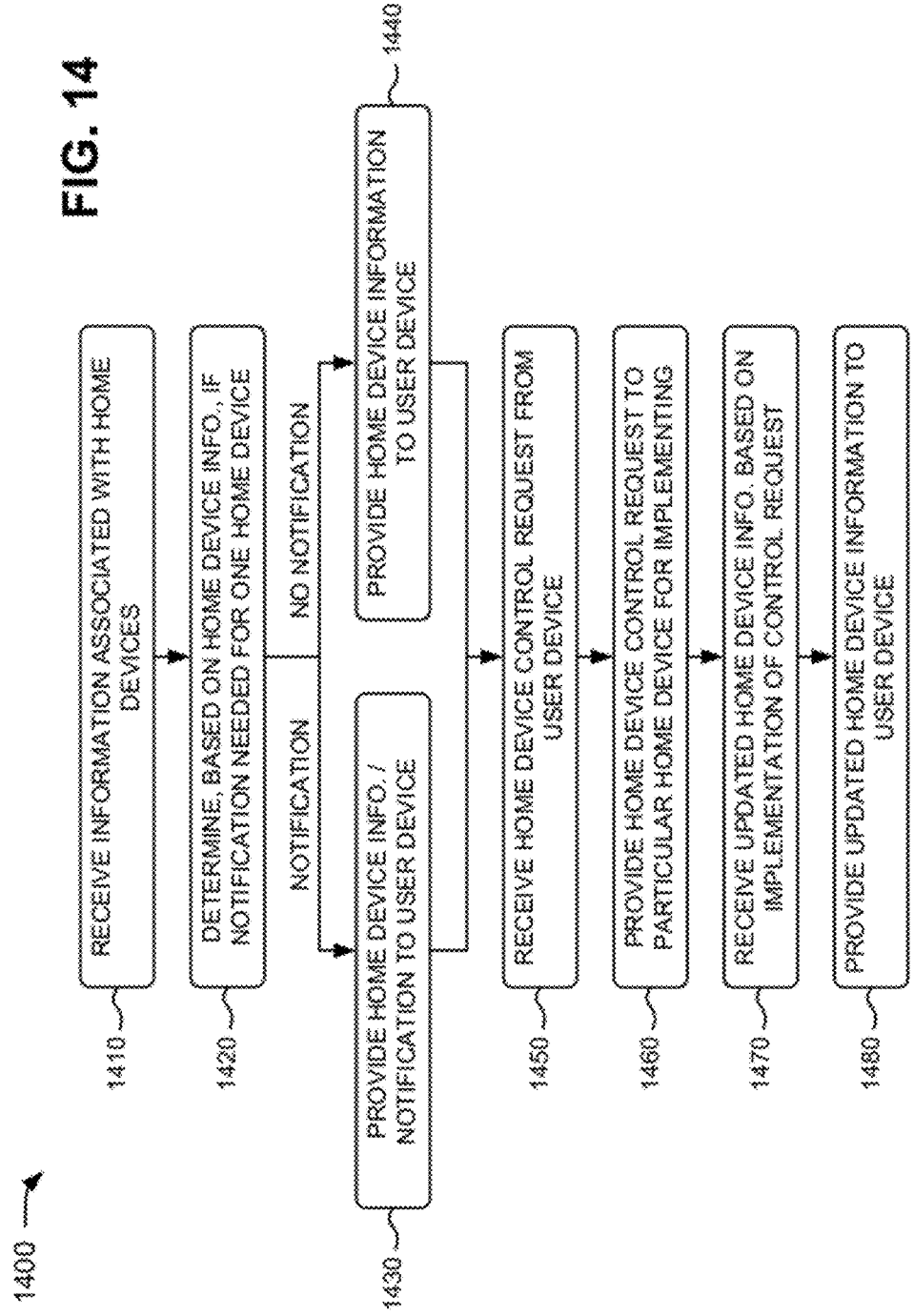
FIG. 14 is a flow chart of an example process for providing smart home device management according to implementations described herein.

FIG. 14 is a flow chart of an example process 1400 for providing smart home device management according to implementations described herein. In one implementation, process 1400 may be performed by backend server 130. In another implementation, some or all of process 1400 may be performed by another device or group of devices, including or excluding backend server 130.

As shown in FIG. 14, process 1400 may include receiving information associated with one or more home devices (block 1410), and determining, based on the home device information, whether a notification is needed for one home device (block 1420). For example, in implementations described above in connection with FIGS. 1 and 13, home devices 150 may generate and provide home device information 180 to one or more service providers 160. Service provider(s) 160 may provide home device information 180 to backend server 130. Home device information 180 may include any information capable of being generated by home devices 150. Backend server 130 may determine, based on home device information 180, if notifications 1320 are needed for one or more of home devices 150.

As further shown in FIG. 14, if a notification is needed for the one home device, process 1400 may include providing the home device information and the notification to a user device (block 1430). If the notification if not needed for the one home device, process 1400 may include providing the home device information to the user device (block 1440). For example, in implementations described above in connection with FIG. 13, if notifications 1320 are needed for one or more home devices 150, backend server 130 may generate notifications 1320 and may provide notifications 1310, with home device information 180, to user devices 110. If notifications 1320 are not needed for one or more home devices 150, backend server 130 may only provide home device information 180 to use devices 110.

Returning to FIG. 14, process 1400 may include receiving a home device control request from the user device (block 1450), and providing the home device control request to a particular home device for implementing (block 1460). For example, in implementations described above in connection with FIG. 13, the user may select one of the items (e.g., items 510-560) of connected home dashboard 1310, may select one of notifications 1320, or may provide other inputs to user device(s) 110, as indicated by reference number 1330. User device(s) 110 may create home device control request 1340 based on selection/input 1330, and may provide home device control request 1340 to backend server 130. Home device control request 1340 may include a request to view information associated with, to control, or to otherwise manipulate one or more home devices 150. In one example, home device control request 1340 may depend on which of items 510-560 the user selected from connected home dashboard 1310. Backend server 130 may provide home device control request 1340 to service providers 160, and service providers 160 may provide home device control request 1340 to one or more home devices 150.

As further shown in FIG. 14, process 1400 may include receiving updated home device information based on implementation of the home device control request (block 1470), and providing the updated home device information to the user device (block 1480). For example, in implementations described above in connection with FIG. 13, home device(s) 150 may receive home device control request 1340, and may perform an action (if any) requested by home device control request 1340, as indicated by reference number 1350. For example, if home device control request 1340 includes a request to adjust a particular thermostat set temperature, the particular thermostat may adjust its set temperature based on home device control request 1340. Home devices 150 may generate updated home device information 1360 based on home device action 1350, and may provide updated home device information 1360 to one or more service providers 160. Service provider(s) 160 may provide updated home device information 1360 to backend server 130, and backend server 130 may provide updated home device information 1360 to one or more user devices 110. Updated home device information 1360 may include home device information 180 and any updates provided to information 180 based on home device action 1350.

FIG. 15 is a flow chart of another example process 1500 for providing smart home device management according to implementations described herein. In one implementation, process 1500 may be performed by user device 110. In another implementation, some or all of process 1500 may be performed by another device or group of devices, including or excluding user device 110.

As illustrated in FIG. 15, process 1500 may include receiving information associated with home devices (block 1505), and providing, based on the home device information, a dashboard that includes a home device item, a modes item, a monitoring item, a security item, an energy item, and a notifications item (block 1510). For example, in implementations described above in connection with FIGS. 5 and 13, user device(s) 110 may receive home device information 180, and may create connected home dashboard 1310 (e.g., user interface 500) based on home device information 180. Connected home dashboard 1310 may include devices/zones item (or widget) 510, modes item 520, monitoring item 530, security item 540, energy item 550, notifications item 560, and activity status section 570. User device(s) 110 may provide connected home dashboard 1310 to a user of user device(s) 110.

As further shown in FIG. 15, process 1500 may include receiving selection of the home device item (block 1515) and displaying information associated with the home devices (block 1520); or receiving selection of the modes item (block 1525) and displaying information associated with modes of the home devices (block 1530). For example, in implementations described above in connection with FIG. 13, if the user selects devices/zones item 510 from connected home dashboard 1310, user device(s) 110 may display information associated with one or more home devices 110, as described above in connection with FIGS. 6A-6E. If the user selects modes item 520 from connected home dashboard 1310, user device(s) 110 may display information associated with modes of home devices 150, as described above in connection with FIGS. 7A-7D.

Returning to FIG. 15, process 1500 may include receiving selection of the monitoring item (block 1535) and displaying information provided by audio/visual home devices (block 1540); or receiving selection of the security item (block 1545) and displaying information associated with a home security system (block 1550). For example, in implementations described above in connection with FIG. 13, if the user selects monitoring item 530 from connected home dashboard 1310, user device(s) 110 may display information provided by audio/visual home devices 150 (e.g., cameras), as described above in connection with FIGS. 8A-8C. If the user selects security item 540 from connected home dashboard 1310, user device(s) 110 may display information associated with a home security system, as described above in connection with FIGS. 9A-9C.

As further shown in FIG. 15, process 1500 may include receiving selection of the energy item (block 1555) and displaying information HVAC devices, electric devices, and/or thermostats (block 1560); or receiving selection of the notifications item (block 1565) and displaying information associated with notifications provided by the home devices (block 1570). For example, in implementations described above in connection with FIG. 13, if the user selects energy item 550 from connected home dashboard 1310, user device(s) 110 may display information associated with HVAC home devices 150, electric home devices 150, and/or thermostats, as described above in connection with FIGS. 10A and 10B. If the user selects notifications item 560 from connected home dashboard 1310, user device(s) 110 may display information associated with notifications generated by home devices 150, as described above in connection with FIGS. 11A-11D.

Systems and/or methods described herein may provide management of home devices via one or more user devices. For example, the systems and/or methods may enable a user of a mobile communication device to receive an overview of the home devices in a single dashboard displayed on the mobile communication device. The user may drill down the dashboard to a particular category of home devices, or may directly view the home devices and/or zones provided or defined in a home. The user may select one of the home devices, and the systems and/or methods may display details associated with the selected home device. The systems and/or methods may also enable the user to control the operation of the selected home device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 14 and 15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communication device-implemented method, comprising:
    receiving, by the mobile communication device, information associated with a plurality of home devices;
    generating, by the mobile communication device and based on the home device information, a connected home dashboard configured to present a single that includes:
        each of a plurality of items, including a home device item, a modes item, a monitoring item, a security item, an energy item, and a notifications item, and
        status information indicative of an activity log of actions, and associated times, performed by one or more of the plurality of home devices in response to user interaction via different ones of the plurality of items;
    providing, by the mobile communication device, the connected home dashboard for display to a user;
    receiving, by the mobile communication device and from the user, a selection of one of the home device item, the modes item, the monitoring item, the security item, the energy item, or the notifications item; and providing, based on the home device information and by the mobile communication device, information associated with the selection for display to the user.

2. The mobile communication device-implemented method of claim 1, where receiving a selection includes receiving selection of the home device item, and the method further comprises:
providing, based on the selection and for display to the user, information associated with at least one of the plurality of home devices.

3. The mobile communication device-implemented method of claim 1, where receiving a selection includes receiving selection of the modes item, and the method further comprises:
providing, based on the selection and for display to the user, information associated with modes of the plurality of home devices.

4. The mobile communication device-implemented method of claim 1, where receiving a selection includes receiving selection of the monitoring item, and the method further comprises:
providing, based on the selection and for display to the user, information provided by audio and visual home devices of the plurality of home devices.

5. The mobile communication device-implemented method of claim 1, where receiving a selection includes receiving selection of the security item, and the method further comprises:
providing, based on the selection and for display to the user, information provided by home devices, of the plurality of home devices, associated with a home security system.

6. The mobile communication device-implemented method of claim 1, where receiving a selection includes receiving selection of the energy item, and the method further comprises:
providing, based on the selection and for display to the user, energy consumption information associated with energy consuming home devices of the plurality of home devices and information associated with energy monitoring home devices of the plurality of home devices.

7. The mobile communication device-implemented method of claim 1, wherein receiving a selection includes receiving selection of the notifications item, and the method further comprises:
providing, based on the selection and for display to the user, information associated with a pending notification and including at least one of:
an image captured in connection with generation of the pending notification,
video captured in connection with generation of the pending notification, or
audio captured in connection with generation of the ending, notification.

8. The mobile communication device-implemented method of claim 1, where the mobile communication device comprises at least one of:
a radiotelephone,
a personal communications system (PCS) terminal,
a personal digital assistant (PDA),
a wireless device,
a smart phone, or
a laptop computer with a wireless air card.

9. A computing device-implemented method, comprising:
receiving, by the computing device, information associated with a plurality of home devices;
determining, by the computing device and based on the home device information, whether a notification is needed for one of the plurality of home devices;
providing, by the computing device and when the notification is needed, the home device information and the notification to a mobile communication device, wherein the notification comprises a short message service message (SMS); and
providing, by the computing device and when the notification is not needed, the bionic device information to the mobile communication device,
wherein the mobile communication device generates a connected home dashboard, for display to a user, based on the home device information, wherein the connected home dash board presents a single interface including:
each of a plurality of items, including a home device item, a modes item, a monitoring item, a security item, an energy item, and a notifications item, and
status information indicative of an activity log of actions, and associated times, performed by one or more of the plurality of home devices in response to user interaction via different ones of the plurality of items.

10. The computing device-implemented method of claim 9, where the plurality of home devices includes one or more of:
devices provided in electrical systems of a home,
devices provided in mechanical systems of a home,
devices provided in communication systems of a home, and
devices provided in entertainment systems of a home.

11. The computing device-implemented method of claim 9, further comprising:
receiving a home device control request from the mobile communication device; and
providing the home device control request to a particular one of the plurality of home devices for implementation.

12. The computing device-implemented method of claim 11, further comprising:
receiving updated home device information based on implementation of the home device control request by the particular one of the plurality of home devices; and
providing the updated home device information to the mobile communication device.

13. A mobile communication device, comprising:
a memory to store a plurality of instructions; and
a processor to execute instructions in the memory to:
receive information associated with a plurality of home devices,
generate, based on the home device information, a connected home dashboard that includes a single interface for presenting:
each of a home device item, a modes item, a monitoring item, a security item, an energy item, and a notifications item, and
status information indicative of a change, and an associated time, to a state of one or more of the plurality of home devices in response to user interaction via different ones of the items;
provide the connected home dashboard for display to a user,
receive, from the user, a selection of one of the home device item, the modes item, the monitoring item, the security item, the energy item, or the notifications item, and provide, based on the home device information and for display to the user, information associated with the selection.

14. The mobile communication device of claim 13, where the selection includes the home device item and the processor is further to execute ins ructions in the memory to:
provide, based on the selection and for display to the user, information associated with at least one of the plurality of home devices.

15. The mobile communication device of claim 13, where the selection includes the modes item and the processor is further to execute instructions in the memory to:
provide, based on the selection and for display to the user, information associated with a home mode, an away mode, a night mode, or a day mode of the plurality of home devices.

16. The mobile communication device of claim 13, where the selection includes the monitoring item and the processor is further to execute instructions in the memory to:
provide, based on the selection and for display to the user, information provided by monitoring devices of the plurality of home devices.

17. The mobile communication device of claim 13, where the selection includes the security item and the processor is further to execute instructions in the memory to:
provide, based on the selection and for display to the user, information associated with a home security system.

18. The mobile communication device of claim 13, where the selection includes the energy item and the processor is further to execute instructions in the memory to:
provide, based on the selection and for display to the user, information associated with energy consuming home devices of the plurality of home devices and information associated with energy monitoring home devices of the plurality of home devices.

19. The mobile communication device of claim 13, wherein the selection includes the notifications item and the processor is further to execute instructions in the memory to:
provide, based on the selection and for display to the user, information associated with a pending notification and including at least one of:
an image captured in connection with mention of the pending notification,
video captured in connection with generation of the pending notification, or
audio captured connection with generation of the pending notification.

20. A device, comprising:
a memory to store a plurality of instructions; and
a processor to execute instructions in the memory to:
receive information associated with a plurality of home devices,
determine, based on the home device information, whether a notification is needed for one of the plurality of home devices,
provide, when the notification is needed, the home device information and the notification to a mobile communication device, wherein the notification includes at least one of:
provide, when the notification is not needed, the home device information to the mobile communication device, wherein the mobile communication device generates a connected home dashboard, for display to a user, based on the home device information, wherein the connected home dash board presents a single interface including:
each of a home device item, a modes item, a monitoring item, a security item, an energy item, and a notifications item, and
status information indicative of a change, and an associated time, to astute of one or more of the plurality of home devices in response to user interaction via different ones of the items,
receive a home device control request from the mobile communication device,
provide the home device control request to a particular one of the plurality of home devices for implementation,
receive updated home device information based on implementation of the home device control request by the particular one of the plurality of home devices, and
provide the updated home device information to the mobile communication device.

21. The device of claim 20, where the plurality of home devices includes one or more of:
devices provided in electrical systems of a home,
devices provided in mechanical systems of a home,
devices provided in communication systems of a home, and
devices provided in entertainment systems of a home.

* * * * *

UNITED STATES PATENT AND TRADEMARK OFFICE
CERTIFICATE OF CORRECTION

| | | |
|---|---|---|
| PATENT NO. | : 8,375,118 B2 | Page 1 of 1 |
| APPLICATION NO. | : 12/948900 | |
| DATED | : February 12, 2013 | |
| INVENTOR(S) | : Jack Jianxiu Hao et al. | |

It is certified that error appears in the above-identified patent and that said Letters Patent is hereby corrected as shown below:

In The Claims

Claim 1, column 26, line 52, replace "configured to present a single that" with --configured to present a single interface that--.

Claim 7, column 27, line 55, replace "ending, notification" with --pending notification--.

Claim 9, column 28, line 11, replace "notification is not needed, the bionic device" with --notification is not needed, the home device--.

Claim 14, column 29, line 6, replace "is further to execute ins ructions" with --is further to execute instructions--.

Claim 19, column 29, line 43, replace "an image captured in connection with mention of the" with --an image captured in connection with generation of the--.

Claim 20, column 30, line 25, replace "time, to astute of one or more of the plurality" with --time, to a state of one or more of the plurality--.

Signed and Sealed this
Twenty-ninth Day of March, 2016

Michelle K. Lee
*Director of the United States Patent and Trademark Office*